(12) United States Patent
Armstrong et al.

(10) Patent No.: US 8,271,710 B2
(45) Date of Patent: Sep. 18, 2012

(54) MOVING OWNERSHIP OF A DEVICE BETWEEN COMPUTE ELEMENTS

(75) Inventors: William J. Armstrong, Rochester, MN (US); Scott N. Dunham, Raleigh, NC (US); David R. Engebretsen, Cannon Falls, MN (US); Ronald E. Freking, Rochester, MN (US); Mehul M. Shah, Austin, TX (US); Steven M. Thurber, Austin, TX (US); Curtis C. Wollbrink, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 12/822,867

(22) Filed: Jun. 24, 2010

(65) Prior Publication Data

US 2011/0320671 A1 Dec. 29, 2011

(51) Int. Cl.
G06F 13/12 (2006.01)
G06F 13/36 (2006.01)
(52) U.S. Cl. ......... 710/200; 710/104; 710/311; 710/313
(58) Field of Classification Search .................. 710/306
See application file for complete search history.

(56) References Cited

U.S. PATENT DOCUMENTS

| | | | |
|---|---|---|---|
| 7,430,630 B2 * | 9/2008 | Boyd et al. ............... | 710/316 |
| 7,457,900 B2 * | 11/2008 | Panesar .................. | 710/104 |
| 7,492,723 B2 * | 2/2009 | Boyd et al. ............... | 370/252 |
| 7,506,084 B2 | 3/2009 | Moerti et al. | |
| 7,549,003 B2 * | 6/2009 | Boyd et al. ............... | 710/104 |
| 7,587,575 B2 | 9/2009 | Moertl et al. | |
| 7,590,817 B2 | 9/2009 | Moertl et al. | |
| 7,600,093 B2 | 10/2009 | Ben-Yehuda et al. | |
| 7,689,755 B2 * | 3/2010 | Balasubramanian et al. ............... | 710/311 |
| 7,707,465 B2 * | 4/2010 | Boyd et al. ............... | 714/57 |
| 7,739,434 B2 * | 6/2010 | Farrell et al. ............ | 710/104 |
| 7,849,286 B2 * | 12/2010 | Sugumar et al. ......... | 711/173 |
| 7,937,518 B2 * | 5/2011 | Boyd et al. ............... | 710/310 |
| 7,966,616 B2 * | 6/2011 | Arndt et al. ............. | 718/104 |
| 2004/0181625 A1 * | 9/2004 | Armstrong et al. ...... | 710/200 |
| 2004/0230709 A1 * | 11/2004 | Moll ....................... | 710/1 |
| 2005/0268298 A1 * | 12/2005 | Hunt et al. .............. | 718/1 |
| 2006/0136653 A1 * | 6/2006 | Traut et al. ............. | 711/6 |

(Continued)

OTHER PUBLICATIONS

IBM U.S. Appl. No. 12/758,213 entitled "Hierarchical to Physical Bus Translation" filed by William J. Armstrong et al. filed Apr. 12, 2010.

(Continued)

*Primary Examiner* — Ryan Stiglic
(74) *Attorney, Agent, or Firm* — Owen J. Gamon

(57) ABSTRACT

In an embodiment, a command is received that requests movement of ownership of a target device from an origin compute element to a destination compute element. From the origin compute element, a translation of a virtual bridge identifier to a first secondary bus identifier, a first subordinate bus identifier, and a first MMIO bus address range is removed. To the destination compute element, a translation of the target virtual bridge identifier to a second secondary bus identifier, a second subordinate bus identifier, and a second MMIO bus address range is added. From a south chip that comprises the target virtual bridge, a translation of the target virtual bridge identifier to an identifier of the origin compute element is removed. To the south chip, a translation of the target virtual bridge identifier to an identifier of the destination compute element is added.

24 Claims, 12 Drawing Sheets

U.S. PATENT DOCUMENTS

| | | | |
|---|---|---|---|
| 2006/0179195 A1* | 8/2006 | Sharma et al. | 710/123 |
| 2006/0195617 A1* | 8/2006 | Arndt et al. | 710/1 |
| 2006/0195623 A1 | 8/2006 | Arndt et al. | |
| 2006/0242352 A1* | 10/2006 | Torudbakken et al. | 710/312 |
| 2006/0242354 A1* | 10/2006 | Johnsen et al. | 710/316 |
| 2006/0277348 A1* | 12/2006 | Wooten | 710/315 |
| 2007/0061549 A1 | 3/2007 | Kaniyur et al. | |
| 2007/0067505 A1 | 3/2007 | Kaniyur et al. | |
| 2007/0097950 A1* | 5/2007 | Boyd et al. | 370/351 |
| 2007/0168643 A1* | 7/2007 | Hummel et al. | 711/207 |
| 2007/0300241 A1 | 12/2007 | Prakash et al. | |
| 2008/0137677 A1* | 6/2008 | Boyd et al. | 370/419 |
| 2008/0222338 A1* | 9/2008 | Balasubramanian et al. | 710/306 |
| 2009/0037614 A1 | 2/2009 | Saripalli | |
| 2009/0089464 A1 | 4/2009 | Lach et al. | |
| 2009/0133016 A1 | 5/2009 | Brown et al. | |
| 2009/0133028 A1 | 5/2009 | Brown et al. | |
| 2009/0144731 A1 | 6/2009 | Brown et al. | |
| 2010/0095033 A1* | 4/2010 | Farrell et al. | 710/104 |
| 2011/0252176 A1* | 10/2011 | Tanaka et al. | 710/313 |

OTHER PUBLICATIONS

IBM U.S. Appl. No. 12/758,256 entitled "Hierarchical to Physical Memory Mapped Input/Output Translation" filed by William J. Armstrong et al. filed Apr. 12, 2010.

IBM U.S. Appl. No. 12/758,329 entitled "Physical to Hierarchical Bus Translation" filed by William J. Armstrong et al. filed Apr. 12, 2010.

IBM U.S. Appl. No. 12/758,383 entitled "Translating a Requester Identifier to a Chip Identifier" filed by William J. Armstrong et al. filed Apr. 12, 2010.

IBM U.S. Appl. No. 12/774,210 entitled "Memory Mapped Input/Output Bus Address Range Translation" filed by David R. Engebretsen et al. filed May 5, 2010.

IBM U.S. Appl. No. 12/787,799 entitled "Memory Mapped Input/Output Bus Address Range Translation for Virtual Bridges" filed by William J. Armstrong et al. filed May 26, 2010.

* cited by examiner

ROUTING TABLE 145-1A

| VIRTUAL BRIDGE ID (409) | CHIP ID (410) | SECONDARY BUS ID (411) | SUBORDINATE BUS ID (412) | MMIO BAR (414) | |
|---|---|---|---|---|---|
| PTP A | CHIP C | BUS A | BUS A | 0X0000 - 0X0FFF | 401 |
| PTP C | CHIP D | BUS C | BUS C | 0X2000 - 0X2FFF | 402 |

FIG. 4

ROUTING TABLE 145-2A

| VIRTUAL BRIDGE ID (509) | CHIP ID (510) | SECONDARY BUS ID (511) | SUBORDINATE BUS ID (512) | MMIO BAR (514) | |
|---|---|---|---|---|---|
| PTP B | CHIP C | BUS B | BUS B | 0X1000 - 0X1FFF | 501 |
| PTP D | CHIP D | BUS D | BUS D | 0X3000 - 0X3FFF | 502 |
|  |  |  |  |  | 503 |

FIG. 5

ROUTING TABLE 145-1B

| VIRTUAL BRIDGE ID (609) | CHIP ID (610) | SECONDARY BUS ID (611) | SUBORDINATE BUS ID (612) | MMIO BAR (614) | |
|---|---|---|---|---|---|
| PTP A | CHIP C | BUS A | BUS A | 0X0000 - 0X0FFF | 601 |

FIG. 6

ROUTING TABLE 145-2B

| VIRTUAL BRIDGE ID (709) | CHIP ID (710) | SECONDARY BUS ID (711) | SUBORDINATE BUS ID (712) | MMIO BAR (714) | |
|---|---|---|---|---|---|
| PTP B | CHIP C | BUS B | BUS B | 0X1000 - 0X1FFF | 701 |
| PTP D | CHIP D | BUS D | BUS D | 0X3000 - 0X3FFF | 702 |
| PTP C | CHIP D | BUS C | BUS C | 0X2000 - 0X2FFF | 703 |

FIG. 7

CONFIGURATION SPACE     222-1A

| SLOT STATUS (1210) | VIRTUAL PTP BRIDGE ID (1211) | |
|---|---|---|
| ENABLED | PTP A | 1201 |
| DISABLED | PTP B | 1202 |
| ENABLED | PTP C | 1203 |
| DISABLED | PTP D | 1204 |

FIG. 12

CONFIGURATION SPACE     222-2A

| SLOT STATUS (1310) | VIRTUAL PTP BRIDGE ID (1311) | |
|---|---|---|
| DISABLED | PTP A | 1301 |
| ENABLED | PTP B | 1302 |
| DISABLED | PTP C | 1303 |
| ENABLED | PTP D | 1304 |

MOVING OWNERSHIP OF A DEVICE BETWEEN COMPUTE ELEMENTS

FIELD

An embodiment of the invention generally relates to computer systems and more particularly to moving ownership of a device between compute elements in a computer system.

BACKGROUND

Computer systems typically comprise a combination of computer programs and hardware, such as semiconductors, transistors, chips, and circuit boards. The hardware within a computer system is typically organized into components, such as processors, storage devices, and I/O (Input/Output) devices. These components typically communicate with each other via another component called a bus.

Buses can be parallel buses, which carry data words or multiple bits in parallel on multiple wires, or serial buses, which carry data in bit-serial form. A bus can be point-to-point, meaning that the bus connects only two components, or multi-drop, meaning that more than two components are connected to the bus. In a multi-drop bus, typically the bus has both data and address wires, and components connected to the bus listen for their unique destination address on the address wires, in order to discern whether data on the data wires is intended for them.

One example of a computer bus is called PCI EXPRESS (PERIPHERAL COMPONENT INTERCONNECT EXPRESS), which uses a network of point-to-point serial links. PCI EXPRESS devices communicate via a logical connection called an interconnect or link. A link is a point-to-point communication channel between two PCI EXPRESS ports, allowing both to send/receive ordinary PCI-requests (e.g., configuration read/writes, I/O read/writes, and memory read/writes) and interrupts.

One way of accessing memory via an I/O bus is via a technique called memory-mapped I/O (MMIO), in which a processor maps addresses in an I/O device into the processor's address space in memory. Areas of the processor's addressable space in memory are reserved for I/O to/from I/O devices. This reservation may be either temporary or permanent. Each I/O device monitors the bus and responds to any processor's read/write from/to the device-assigned address space in memory. Thus, if the processor issues a read instruction to the device-assigned address space in memory, the I/O device receives the instruction from the bus and transmits the data (onto the bus) that is located at the corresponding address within the I/O device. Similarly, if the processor issues a write instruction to the device-assigned address space in memory, the I/O device receives the data from the bus and writes it to the corresponding address within the I/O device. In some MMIO schemes, the processor instructions that read/write from/to the device-assigned address space in memory are the same instructions that read/write from/to memory in address spaces that are not reserved for I/O devices. In other MMIO schemes, the processor instructions that read/write from/to the device-assigned address space in memory are different instructions from those that read/write from/to memory in address spaces that are not reserved for I/O devices.

SUMMARY

A method, computer-readable storage medium, and computer system are provided. In an embodiment, a command is received that requests movement of ownership of a target device from an origin compute element to a destination compute element. From the origin compute element, a translation of a virtual bridge identifier to a first secondary bus identifier, a first subordinate bus identifier, and a first MMIO bus address range is removed. To the destination compute element, a translation of the target virtual bridge identifier to a second secondary bus identifier, a second subordinate bus identifier, and a second MMIO bus address range is added. From a south chip that comprises the target virtual bridge, a translation of the target virtual bridge identifier to an identifier of the origin compute element is removed. To the south chip, a translation of the target virtual bridge identifier to an identifier of the destination compute element is added.

BRIEF DESCRIPTION OF THE SEVERAL VIEWS OF THE DRAWINGS

FIG. 4 depicts a block diagram of an example data structure for a routing table in an origin compute element, prior to the movement of ownership of a device from the origin compute element to a destination compute element, according to an embodiment of the invention.

FIG. 5 depicts a block diagram of an example data structure for a routing table in a destination compute element, prior to the movement of the ownership of a device from the origin compute element to the destination compute element, according to an embodiment of the invention.

FIG. 6 depicts a block diagram of an example data structure for a routing table in an origin compute element, after the movement of the ownership of a device from the origin compute element to the destination compute element, according to an embodiment of the invention.

FIG. 7 depicts a block diagram of an example data structure for a routing table in a destination compute element, after the movement of the ownership of a device from the origin compute element to the destination compute element, according to an embodiment of the invention.

FIG. 12 depicts a block diagram of an example data structure for a configuration space in an origin north chip, prior to the movement of the ownership of a device from the origin compute element to the destination compute element, according to an embodiment of the invention.

FIG. 13 depicts a block diagram of an example data structure for a configuration space in a destination north chip, prior to the movement of the ownership of a device from the origin compute element to the destination compute element, according to an embodiment of the invention.

The appended drawings illustrate only example embodiments of the invention, and are therefore not considered a limitation of its scope.

DETAILED DESCRIPTION

Figure 1:
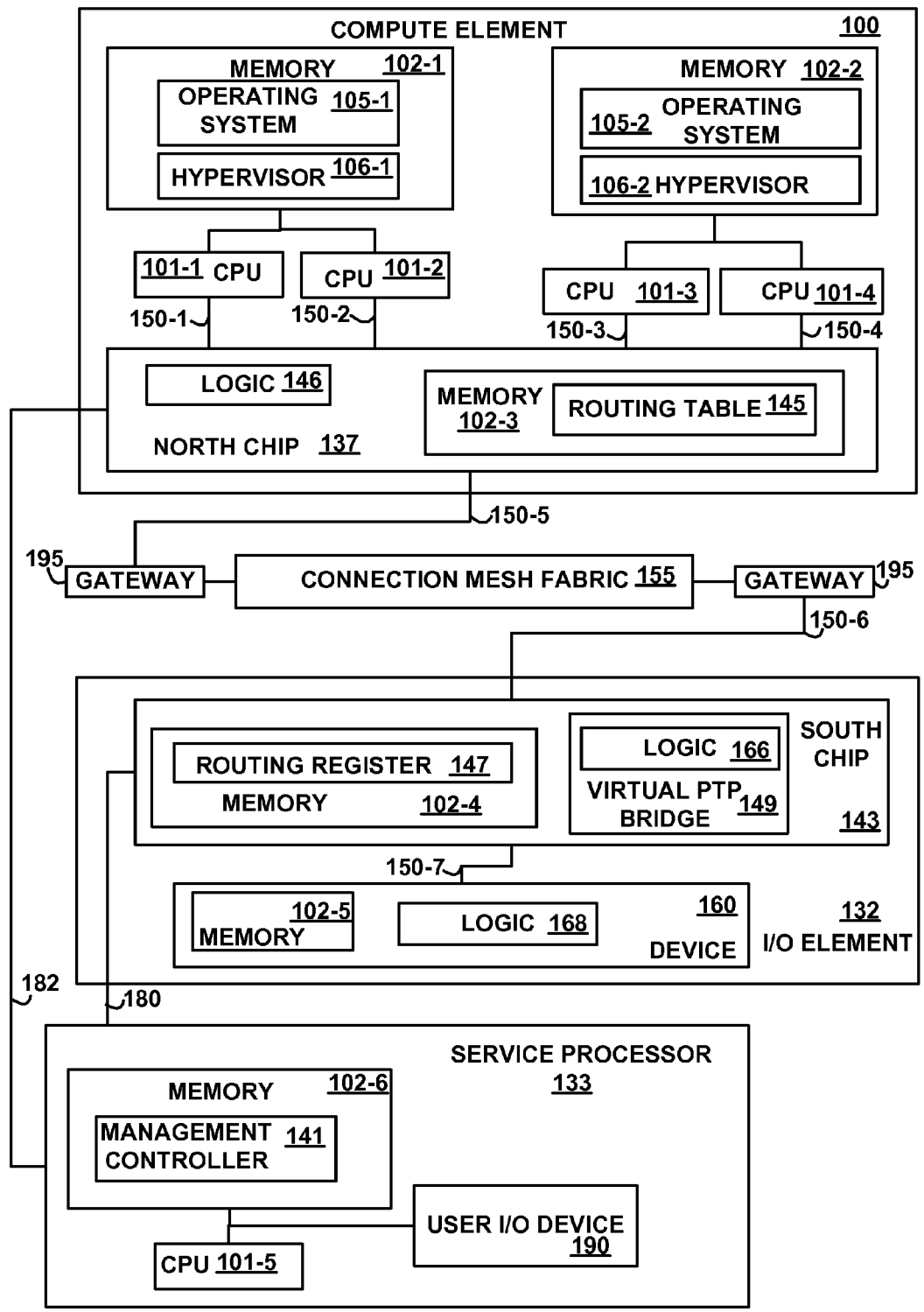
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system comprising the major components of a compute element 100 connected to an I/O (Input/Output) element 132 via gateways 195 and a connection mesh fabric 155. The I/O element 132 is also connected to a service processor 133 via a communications link 180, and the compute element 100 is connected to the service processor 133 via a communications link 182.

The major components of the compute element 100 comprise memory 102-1, memory 102-2, central processing units (CPUs) 101-1, 101-2, 101-3, and 101-4, and a north chip 137. The CPUs 101-1 and 101-2 are connected to and share the memory 102-1, and the CPUs 101-3 and 101-4 are connected to and share the memory 102-2 via respective memory buses. The CPUs 101-1, 101-2, 101-3, and 101-4 are connected to the north chip 137 via respective buses 150-1, 150-2, 150-3, and 150-4. The CPUs 101-1, 101-2, 101-3, and 101-4 are also referred to herein as processors. The north chip 137 is connected to the connection mesh fabric 155 via a bus 150-5 and a gateway 195.

In various embodiments, the compute element 100 and/or the service processor 133 are multi-user mainframe computer systems, single-user computer systems, or server computer systems that have little or no direct user interface, but receive requests from other computer systems (clients). In other embodiments, the compute element 100 and/or the service processor 133 are implemented as desktop computers, portable computers, laptop or notebook computers, tablet computers, pocket computers, telephones, smart phones, pagers, automobiles, teleconferencing system, appliances, or any other appropriate type of electronic device.

Each processor 101-1, 101-2, 101-3, and 101-4 executes instructions stored in the memory 102-1 or 102-2, and each processor may also include cache memory. The memories 102-1 and 102-2 store or encode respective operating systems 105-1 and 105-2, which, when executed on the respective processors, control the operations of the compute element 100. The memories 102-1 and 102-2 further store or encode respective hypervisors 106-1 and 106-2, which, when executed on the respective processors, allocate resources to their respective operating systems 105-1 and 105-2, as further described below with reference to FIGS. 16, 17, and 18. The compute element 100 may use virtual addressing mechanisms that allow the programs of the compute element 100 to behave as if they only have access to a large, single storage entity instead of access to multiple, smaller storage entities. Thus, all portions of an operating system 105-1 and 105-2 are not necessarily completely stored in the same storage device at the same time.

In various embodiments, the north chip 137 is implemented as a chip, integrated circuit, circuit board, logic devices, memory, and/or a processor. The north chip 137 comprises logic 146 and a routing table 145. The routing table 145 is stored in memory 102-3 and comprises translations, mappings, or assignments of virtual bridge identifiers and chip identifiers to secondary bus identifiers, subordinate bus identifiers, and MMIO bus address ranges, as further described below with reference to FIGS. 4, 5, 6, and 7. The logic 146 controls the operations of the north chip 137.

In an embodiment, the connection mesh fabric 155 comprises a point-to-point serial connection between the compute element 100 and the I/O element 132 via the gateways 195. In other embodiments, the connection mesh fabric 155 may be any suitable network or combination of networks and may support any appropriate protocol suitable for communication of data and/or code to/from the compute element 100 and the I/O element 132. In an embodiment, the connection mesh fabric 155 may be implemented via an Ethernet network, but in other embodiments any appropriate network or combination of networks implementing any appropriate protocol may be used.

In an embodiment, the connection mesh fabric 155 uses a different communications protocol than do the buses 150-5 and 150-6, and the gateways 195 are electronic components that join and translate between buses of different protocols. Although the gateways 195 are illustrated as separate from the compute element 100, the connection mesh fabric 155, and the I/O element 132, in other embodiments, the gateways 195 may be implemented as a component in the compute element 100, in the connection mesh fabric 155, or in the I/O element 132.

In various embodiments, the I/O element 132 is implemented as a system element, an electronic device, an endpoint, a computer, or a circuit board. The I/O element 132 comprises a south chip 143 connected to the connection mesh fabric 155 via a bus 150-6 and a gateway 195. The south chip 143 is further connected to a device 160 via a bus 150-7. The south chip 143 is implemented as a chip, integrated circuit, circuit board, logic devices, memory, and/or a processor. In an embodiment, the south chip 143 is identical to the north chip 137, but the chips 137 and 143 perform different functions depending on whether they are located on the compute element 100 or the I/O element 132. In another embodiment, the chips 137 and 143 are different, and each is customized for its respective element.

The south chip 143 comprises memory 102-4 and a virtual PTP (PCI to PCI) bridge 149, which comprises logic 166. A virtual bridge is an electronic component or components that forward packets of data and/or commands between two different networks, different segments of networks, or different buses that use the same communications protocol, based on a destination address in the packet. Although an embodiment of the invention is described in the context of the PCI EXPRESS bus protocol, in other embodiments any appropriate bus protocol may be used. The memory 102-4 comprises a routing register 147, which is further described below with reference to FIGS. 8, 9, 10, and 11.

In an embodiment, the device 160 is a storage device or a combination of storage devices, either connected within the I/O element 132 or connected directly or indirectly to the I/O element 132. In another embodiment, the device 160 comprises a network adapter, I/O adapter, or I/O processor that connects to a communications network. Although the device 160 is illustrated as being contained within the I/O element 132, in another embodiment, the device 160 is separate from and connected to the I/O element 132. The device 160 comprises logic 168 and memory 102-5, which the compute element 100 may access via MMIO commands, requests, or operations sent to the device 160 via the connection mesh fabric 155, the gateways 195, and the south chip 143.

In an embodiment, the operating systems 105-1 and 105-2, the hypervisors 106-1 and 106-2, and the logic 146, 166, and 168 are implemented as chips, circuits, and/or logic devices. In another embodiment, some or all of the logic 146, 166, and/or 168 comprise memory encoded with instructions or statements and a processor on which the instructions or statements execute or are interpreted. In an embodiment, the operating systems 105-1 and 105-2 and the hypervisors 106-1 and 106-2 comprise instructions that execute on their respective processors 101-1, 101-2, 101-3, and 101-4 or statements that are interpreted by instructions that execute on their respective processors 101-1, 101-2, 101-3, and 101-4 to perform processing, operations, or functions, as further described below with reference to FIGS. 16, 17, and 18. The logic 146, 166, and 168 perform processing, operations, or functions, as further described below with reference to FIGS. 16, 17, and 18.

Although the buses 150-1, 150-2, 150-3, 150-4, 150-5, 150-6, and 150-7 are shown in FIG. 1 as relatively simple, single bus structures providing direct communication paths, in fact the buses 150-1, 150-2, 150-3, 150-4, 150-5, 150-6, and 150-7 may comprise multiple different buses or communication paths, which may be arranged in any of various forms, such as point-to-point links in hierarchical, star or web configurations, multiple hierarchical buses, parallel and redundant paths, or any other appropriate type of configuration. In an embodiment, the buses 150-1, 150-2, 150-3, 150-4, 150-5, 150-6, and 150-7 are point-to-point serial buses, such as the PCI EXPRESS bus, but in other embodiments, any appropriate bus may be used. Further, buses 150-1, 150-2, 150-3, 150-4, 150-5, 150-6, and 150-7 may comprise memory buses, I/O buses, I/O bus interface units, I/O processors, or any multiple and/or combination thereof.

The service processor 133 comprises memory 102-6 connected via a bus to a CPU 101-5 and a user I/O device 190. The memory 102-6 stores or encodes a management controller 141. In an embodiment, the management controller 141 comprises instructions or statements that execute or are interpreted by instructions that execute on the CPU 101-5. In another embodiment, the management controller 141 comprise circuits or logic devices in lieu of or in addition to a processor based system. The management controller 141 performs processing, operations, or functions, as further described below with reference to FIGS. 16, 17, and 18.

In various embodiments, the user input/output device 190 may include user output devices (such as a video display device, speaker, printer, and/or television set) and user input devices (such as a keyboard, mouse, keypad, touchpad, trackball, buttons, light pen, or other pointing device). A user may manipulate the user input devices, in order to provide input to the user input/output device 190 and the management controller 141 via a user interface, and may receive output via the user output devices. For example, a user interface may be presented via the user I/O device 190, such as displayed on a display device, played via a speaker, or printed via a printer.

In various embodiments, the memory 102-1, 102-2, 102-3, 102-4, 102-5, and 102-6 are random-access semiconductor memory, registers, storage devices, non-volatile memory, volatile memory, disk drives, or storage mediums for storing or encoding data and programs. The memory 102-1, 102-2, 102-3, 102-4, 102-5, and 102-6 are conceptually single monolithic entities, but in other embodiments the memory 102-1, 102-2, 102-3, 102-4, 102-5, and 102-6 are more complex arrangements, such as hierarchies of caches and/or other memory devices. For example, the memory 102-1, 102-2, 102-3, 102-4, 102-5, and 102-6 may exist in multiple levels of memory devices of varying sizes and speeds.

FIG. 1 is intended to depict the representative major components of the compute element 100, the connection mesh fabric 155, the gateways 195, the I/O element 132, and the service processor 133 at a high level. Individual components may have greater complexity than represented in FIG. 1, components other than or in addition to those shown in FIG. 1 may be present, and the number, type, and configuration of such components may vary. Several particular examples of such additional complexity or additional variations are disclosed herein, but these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the compute element 100, the I/O element 132, the service processor 133, and/or the device 160 and that, when read and executed by one or more processors in the compute element 100, the I/O element 132, the service processor 133, and/or the device 160 or when interpreted by instructions that are executed by one or more processors, cause the compute element 100, I/O element 132, the service processor 133, and/or the device 160 to perform the actions necessary to execute steps or elements comprising the various aspects of embodiments of the invention.

Aspects of embodiments of the present invention may be embodied as a system, method, or computer program product. Accordingly, aspects of embodiments of the present invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Furthermore, embodiments of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. A computer-readable storage medium may be any non-transitory tangible medium that can contain, or store, a program for use by or in connection with an instruction execution system, apparatus, or device. Examples of computer-readable storage media include the memory 102-1, 102-2, 102-3, 102-4, 102-5, and 102-6.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device.

Program code embodied on a computer-readable medium may be transmitted using any appropriate medium, including but not limited to, wireless, wire line, optical fiber cable, Radio Frequency (RF), or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks. The computer programs defining the functions of various embodiments of the invention may be delivered to the compute element 100, the I/O element 132, the service processor 133, and/or the device 160 via a variety of tangible computer-readable storage media that may be operatively or communicatively connected (directly or indirectly) to the processor or processors.

The computer program instructions may also be loaded onto a computer, the compute element 100, the I/O element 132, the service processor 133, and/or the device 160, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the present invention may also be delivered as part of a service engagement with a client corporation, nonprofit organization, government entity, or internal organizational structure. Aspects of these embodiments may comprise configuring the compute element 100, the I/O element 132, the service processor 133, and/or the device 160 to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, compute elements, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments the invention.

Figure 2:
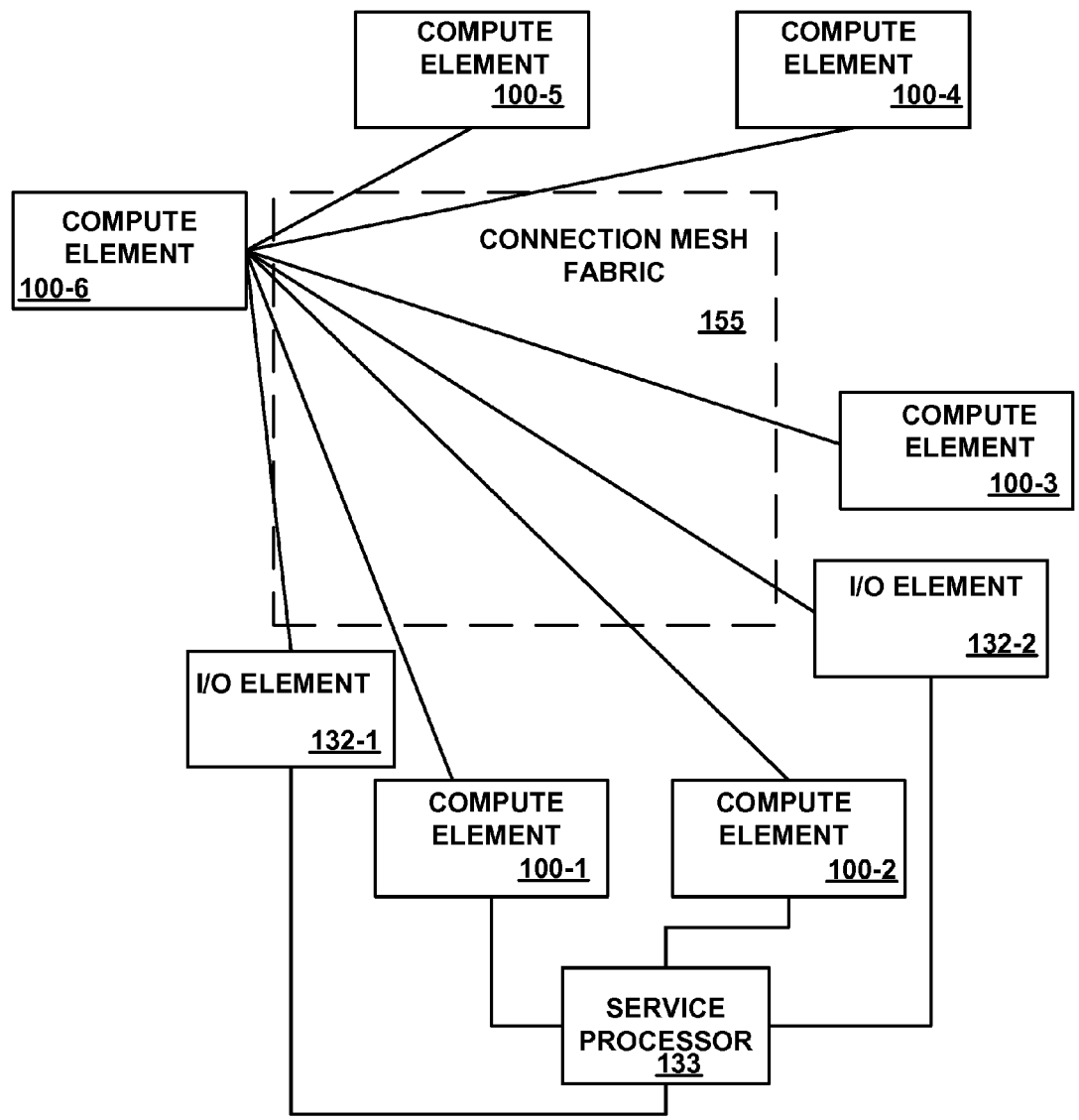
FIG. 2 depicts a block diagram illustrating selected components of an embodiment of the invention.

FIG. 2 depicts a block diagram illustrating the interaction of selected components of an embodiment of the invention. The compute elements 100-1, 100-2, 100-3, 100-4, 100-5, and 100-6, and the I/O elements 132-1 and 132-2 are connected via the connection mesh fabric 155 and the gateways 195 (FIG. 1). The compute elements 100-1, 100-2, 100-3, 100-4, 100-5, and 100-6 are examples of, and are generically referred to by, the compute element 100 (FIG. 1). The I/O elements 132-1 and 132-2 are examples of, and are generically referred to by, the I/O element 132 (FIG. 1).

The connection mesh fabric 155 comprises serial point-to-point links. In another embodiment, the connection mesh fabric 155 comprises parallel point-to-point links. For convenience of illustration, FIG. 2 depicts compute element 100-6 as connected to every other compute and I/O element 100-1, 100-2, 100-3, 100-4, 100-5, 132-1, and 132-2. But, all compute elements 100 and I/O elements 132 are connected to each and every other compute element 100 and I/O element 132 via high speed point-to-point links in an interconnection of everything-to-everything, which is referred to as the connection mesh fabric 155. Thus, e.g., the compute elements 100-1 and 100-2 are both connected to the I/O element 132-1 via different point-to-point connections. As another example, the compute elements 100-1 and 100-2 are both connected to the I/O element 132-2 via different point-to-point connections. Thus, if one point-to-point link fails, elements may still communicate to each other by hopping though another element. In an embodiment, the connection mesh fabric 155 is not necessarily confined to a single chassis or rack, but may span multiple chassis or racks.

The service processor 133 is illustrated as connected to the compute elements 100-1 and 100-2 and the I/O elements 132-1 and 132-2, but in other embodiments, the service processor 133 is connected to every compute element 100 and I/O element 132.

Figure 3:
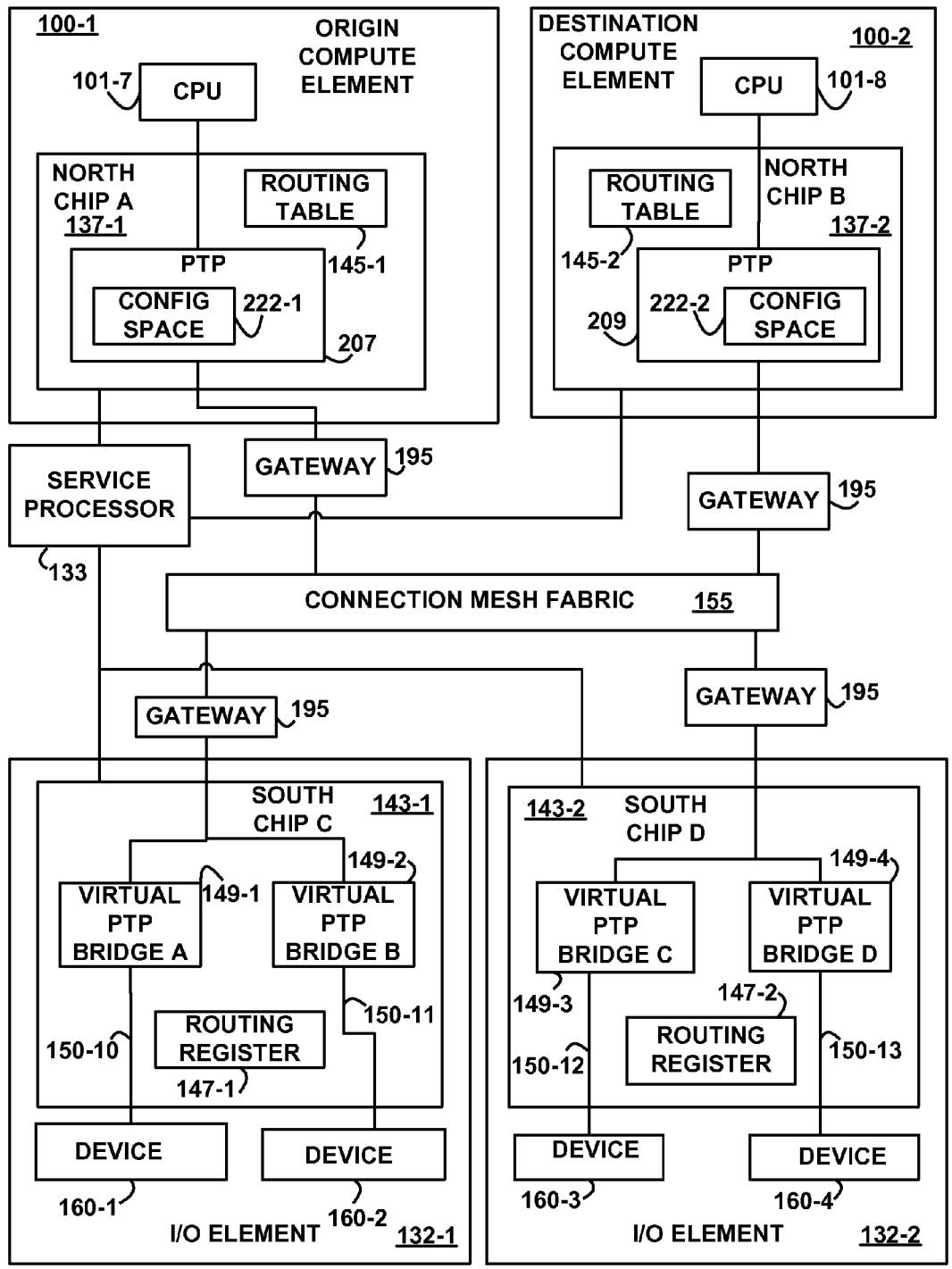
FIG. 3 depicts a block diagram illustrating more detail of selected components of an embodiment of the invention.

FIG. 3 depicts a block diagram illustrating more detail of selected components of an embodiment of the invention. As illustrated in FIG. 3, the compute elements 100-1 and 100-2 are connected via the gateways 195 and the connection mesh fabric 155 to the I/O elements 132-1 and 132-2. The compute element 100-1 comprises a CPU 101-7 connected via a bus to a PTP (PCI to PCI) bridge 207 in a north chip 137-1. The north chip 137-1 is further connected to the service processor 133. The CPU 101-7 is an example of the CPUs 101-1, 101-2, 101-3, or 101-4 (FIG. 1).

The north chip 137-1 comprises a PTP bridge 207, meaning that both the ingress and egress buses that are connected to respective ingress and egress ports of the PTP bridge 207 are the same type of bus using the same protocol, such as in an embodiment, both being PCI buses. The PTP bridge 207 comprises a configuration space 222-1 stored in memory, which is further described below with reference to FIGS. 12 and 14. The north chip 137-1 further comprises a routing table 145-1, which is an example of, and is generically referred to by, the routing table 145 (FIG. 1). The north chip 137-1 is an example of, and is generically referred to by, the north chip 137 (FIG. 1).

The compute element 100-2 comprises a CPU 101-8 connected via a bus to a PTP bridge 209 in a north chip 137-2. The north chip 137-2 is further connected to the service processor 133. The CPU 101-8 is an example of the CPUs 101-1, 101-2, 101-3, or 101-4 (FIG. 1).

The north chip 137-2 comprises the PTP (PCI to PCI) bridge 209, meaning that both the ingress and the egress bus that are connected to respective ingress and egress ports of the PTP bridge 209 communicate via the same bus protocol, such as in an embodiment both being PCI buses. The PTP bridge 209 comprises a configuration space 222-2 stored in memory, which is further described below with reference to FIGS. 13 and 15. The north chip 137-2 further comprises a routing table 145-2, which is an example of, and is generically referred to by, the routing table 145 (FIG. 1). The north chip 137-2 is an example of, and is generically referred to by, the north chip 137 (FIG. 1).

The I/O element 132-1 comprises a south chip 143-1 connected to the gateway 195 via an ingress port and a bus and connected to the devices 160-1 and 160-2 via respective egress ports and buses 150-10 and 150-11. The south chip 143-1 comprises a routing register 147-1, which is an example of, and is generically referred to by the routing register 147 (FIG. 1). The south chip 143-1 further comprises a virtual PTP bridge 149-1 and a virtual PTP bridge 149-2, which are examples of, and generically referred to by, the virtual PTP bridge 149 (FIG. 1). The virtual PTP bridge 149-1 is connected via an egress port and the bus 150-10 to the device 160-1, and the virtual PTP bridge 149-2 is connected via an egress port and the bus 150-11 to the device 160-2.

In an embodiment, a single port may act as an ingress port at one time while data is being transmitted in one direction and an egress port at other time at another time while data is being transmitted in the other direction. In another embodiment, a single port only acts as an ingress or an egress port, and multiple ports are present, in order to provide bi-directional data transfer (both from a compute element 100 to a device 160 and from a device 160 to a compute element 100). Also, the I/O elements 132 may have multiple ports connecting to the gateways 195, in order to provide the everything-to-everything connection to other elements via the connection mesh fabric 155.

The I/O element 132-2 comprises a south chip 143-2 connected to the gateway 195 via an ingress port and bus and connected to the devices 160-3 and 160-4 via respective egress ports and bus 150-12 and 150-13. The south chip 143-2 comprises a routing register 147-2, which is an example of, and is generically referred to by the routing register 147 (FIG. 1). The south chip 143-2 comprises virtual PTP bridges 149-3 and 149-4, which are examples of, and generically referred to by, the virtual PTP bridge 149 (FIG. 1). The virtual PTP bridge 149-3 is connected via an egress port and the bus 150-12 to the device 160-3, and the virtual PTP bridge 149-4 is connected via an egress port and the bus 150-13 to the device 160-4.

The devices 160-1, 160-2, 160-3, and 160-4 are examples of, and are generically referred to by, the device 160 (FIG. 1). Each of the devices 160-1, 160-2, 160-3, and 160-4 stores or encodes in its memory a respective MMIO address range. These MMIO addresses ranges may be different for different compute elements, meaning that a different compute element may access the same memory location within a device 160 via different ranges of MMIO addresses. The buses 150-10, 150-11, 150-12, and 150-13 are examples of, and are generically referred to by, the bus 150-7 (FIG. 1).

FIG. 4 depicts a block diagram of an example data structure and values for a routing table 145-1A in an origin compute element, prior to the movement of ownership of a device from the origin compute element to a destination compute element, according to an embodiment of the invention. The routing table 145-1A is an example of, and is generically referred to by the routing table 145-1 (FIG. 3). The routing table 145-1A comprises example entries or rows 401 and 402, each of which includes a virtual PTP bridge identifier field 409, a south chip identifier field 410, a secondary bus identifier field 411, a subordinate bus identifier field 412, and an MMIO bus address range field 414.

The MMIO bus address range field 414 specifies a range or extent of MMIO addresses that the compute element 100-1 may use to address or access the memory of a device or devices 160 that are downstream from the virtual PTP bridge 149 (identified by the value in the virtual PTP bridge identifier field 409 in the same entry) in a south chip 143 (identified by the value in the south chip identifier 410 in the same entry). Thus, the MMIO bus address range assigned to a virtual PTP bridge 149 is the range of MMIO addresses that are assigned and addressable to devices 160 downstream from that virtual PTP bridge 149. The downstream device or devices 160 are connected to the virtual PTP bridge 409 via a bus or buses whose bus identifiers are encompassed by, or are within, the bus range specified by the secondary bus identifier 411 and the subordinate bus identifier 412, in the same entry. The secondary bus identifier 411 identifies the first bus that is immediately downstream from the virtual PTP bridge 409 and that connects directly to the virtual PTP bridge 409, in the same entry. The subordinate bus identifier 412 specifies the highest (largest) bus identifier of all of the buses that can be reached downstream from the virtual PTP bridge 409. In various embodiments, buses that can be reached (are reachable) downstream from the virtual PTP bridge 409 are connected directly to the virtual PTP bridge 409 or indirectly through other PTP bridges. Downstream refers to a relative physical position of a component (either a bus or a device 160) that is farther from the compute element 100 than is the relative position of a component that is upstream, or nearer to the compute element 100.

Using the example of FIG. 3, the device 160-1 is downstream from the virtual PTP bridge A 149-1, and the virtual PTP bridge A 149-1 is upstream from the device 160-1 because the device 160-1 is farther from the compute element 100-1 than is the virtual PTP bridge A 149-1. The device 160-3 is downstream from the virtual PTP bridge C 149-3, and the virtual PTP bridge C 149-3 is upstream from the device 160-3 because the device 160-3 is farther from the compute element 100-2 than is the virtual PTP bridge C 149-3.

Referring again to FIG. 4, each example entry 401 and 402 has identical respective secondary bus identifiers 411 and subordinate bus identifiers 412 because, in the example of FIG. 3, each virtual PTP bridge has only one downstream bus. But, in other embodiments, the I/O elements 132 may include a hierarchy of virtual PTP bridges 149, in which a particular virtual PTP bridge has multiple downstream PTP bridges and/or buses.

The MMIO bus address range field 414 specifies a beginning (lower bound or memory base address) of the range and an end (upper bound or memory limit address) of the range. The memory base address is less than the memory limit address. The values in the MMIO bus address range field 414 are unique within the compute element 100-1 that assigns them, but are not necessarily unique within a south chip 143 or across all south chips 143. That is, multiple devices 160 connected to the same south chip 143 may have the same range values, different range values, or overlapping range values in their respective MMIO bus address range fields (in different routing tables 145 in different north chips 137) if those values were assigned by different compute elements 100. Further, multiple devices 160 connected to different south chips 143 may have the same values or overlapping range values in their respective MMIO bus address range fields (in different routing tables 145 in different north chips 137) if those values were assigned by different compute elements 100. Range values overlap if the memory base address of one range is between the memory base address and memory limit address of another range. Also, range values overlap if the memory limit address of one range is between the memory base address and memory limit address of another range.

Thus, the entries of the routing table 145-1A represent translations of MMIO bus address ranges 414, secondary bus identifiers 411, and subordinate bus identifiers 412 used by the compute element 100-1 to virtual PTP bridge identifiers 409 that identify virtual PTP bridges 149 that are contained within south chips 143 identified by the chip identifiers 410, in the same entry. Hence, the MMIO bus address range 414, the secondary bus identifier 411, and the subordinate bus identifier 412 are assigned to the virtual PTP bridge identifier 409 and the south chip identifier 410 in the same entry. The assignment or ownership of the MMIO bus address range 414, the secondary bus identifier 411, and the subordinate bus identifier 412 to the virtual PTP bridge identifier 409 and the south chip identifier 410 is unique within the routing table 145-1A, meaning that no two entries in a routing table 145-1A contain the same or overlapping MMIO bus address ranges 414.

The example entry 401 in the routing table 145-1A comprises data that indicates that the south chip 143-1 identified by the value "Chip C" in the south chip identifier field 410 comprises a virtual PTP bridge 149-1 identified by the value "PTP A" in the virtual PTP bridge identifier field 409 that is assigned or that translates or maps to a secondary bus identifier 411 of "Bus A," a subordinate bus identifier 412 of "Bus A," and an MMIO bus address range 414 of 0x0000-0x0FFF. Because the virtual PTP bridge identifier field 409 specifies a virtual PTP bridge identifier value in entry 401, the virtual PTP bridge identified by that value "PTP A" is assigned to, or is owned by the compute element 100-1, which comprises the north chip 137-1, which comprises the routing table 145-1A. Ownership or assignment means that the compute element 100-1 is the only compute element that sends read and write commands to the assigned or owned device 160-1, and, e.g., the compute element 100-2 does not send read and/or write commands to the assigned or owned device 160-1.

The device 160-1 is connected to the virtual PTP bridge 149-1 identified by the virtual PTP bridge identifier 409 of "PTP A" via a bus whose bus identifier is encompassed by or falls within the range of bus identifiers specified by the secondary bus identifier 411 of "Bus A" and the subordinate bus identifier 412 of "Bus A." The virtual PTP bridge 149-1 identified by the virtual PTP bridge identifier 409 of "PTP A" forwards configuration commands that specify a bus identifier encompassed by the range of the secondary bus identifier 411 of "Bus A" and the subordinate bus identifier 412 of "Bus A" to the buses, PTP bridges, and devices 160 that are downstream from the virtual PTP bridge 149-1 "PTP A." The virtual PTP bridge 149-1 identified by the virtual PTP bridge identifier 409 of "PTP A" forwards MMIO commands that specify an MMIO address encompassed by the MMIO bus address range 414 of 0x0000 through 0x0FFF to the buses, PTP bridges, and devices 160 that are downstream from the virtual PTP bridge "PTP A."

Thus, in response to the CPU 101-7 issuing a read/write command from/to a MMIO address within or encompassed by the range of 0x0000 through 0x0FFF, the north chip 137-1 finds the MMIO bus address range 414 in the entry 401 that encompasses the MMIO address specified by the read/write command and sends the read/write command to the device 160-1 that is connected via the Bus A (to the virtual PTP bridge A 149-1 in the south chip C 143-1 and does not send the command to other devices.

The example entry 402 in the routing table 145-1A comprises data that indicates that the south chip 143-2 identified by the value "Chip D" in the south chip identifier field 410 comprises a virtual PTP bridge 149-3 identified by the value "PTP C" in the virtual PTP bridge identifier field 409 that is assigned or that maps or translates to a secondary bus identifier 411 of "Bus C," a subordinate bus identifier 412 of "Bus C," and an MMIO bus address range 414 of 0x2000-0x2FFF.

A device 160-3 is connected to the virtual PTP bridge 149-3 identified by the virtual PTP bridge identifier 409 of "PTP C" via a bus whose bus identifier is encompassed by or falls within the range of bus identifiers specified by the secondary bus identifier 411 of "Bus C" and the subordinate bus identifier 412 of "Bus C." The virtual PTP bridge 149-3 identified by the virtual PTP bridge identifier 409 of "PTP C" forwards configuration commands that specify a bus identifier encompassed by the range of the secondary bus identifier 411 of "Bus C" and the subordinate bus identifier 412 of "Bus C" to the buses, PTP bridges, and devices 160 that are downstream from the virtual PTP bridge "PTP C." The virtual PTP bridge 149-3 identified by the virtual PTP bridge identifier 409 of "PTP C" forwards MMIO commands that specify an MMIO address encompassed by the MMIO bus address range 414 of 0x2000-0x2FFF to the buses, virtual PTP bridges 149, and devices 160 that are downstream from the virtual PTP bridge "PTP C."

Thus, in response to the CPU 101-7 issuing a read/write command from/to a MMIO address within or encompassed by the range of 0x2000 through 0x2FFF, the north chip 137-1 finds the MMIO bus address range 414 in the entry 402 that encompasses the MMIO address specified by the read/write command and sends the read/write command to the device 160-3 that is connected via the Bus C to the virtual PTP bridge C 149-3 in the south chip D 143-2 and does not send the command to other devices.

FIG. 5 depicts a block diagram of an example data structure for a routing table 145-2A in a destination compute element, prior to the movement of the ownership of a device from an origin compute element to the destination compute element, according to an embodiment of the invention. The routing table 145-2A is an example of, and is generically referred to by the routing table 145-2 (FIG. 3).

The routing table 145-2A comprises example entries 501 and 502, each of which includes a virtual PTP bridge identifier field 509, a south chip identifier field 510, a secondary bus identifier field 511, a subordinate bus identifier field 512, and an MMIO bus address range field 514. The routing table 145-2A further comprises an example entry 503, which is unused.

The MMIO bus address range field 514 specifies a range or extent of MMIO addresses that the compute element 100-2 may use to address the memory of a device or devices 160 that are downstream from the virtual PTP bridge 149 (identified by the value in the virtual PTP bridge identifier field 509 in the same entry) in a south chip 143 (identified by the value in the south chip identifier 510 in the same entry). The downstream device or devices 160 are connected to the virtual PTP bridge 509 via a bus or buses whose bus identifiers are encompassed by, or are within, the bus range specified by the secondary bus identifier 511 and the subordinate bus identifier 512, in the same entry. The secondary bus identifier 511 identifies the bus immediately downstream from the virtual PTP bridge 509. The subordinate bus identifier 512 specifies the highest bus identifier of all of the buses that can be reached downstream from the virtual PTP bridge 509.

Referring again to FIG. 5, in the example routing table 145-2A, each entry 501 and 502 has identical respective secondary bus identifiers 511 and subordinate bus identifiers 512 because, in the example of FIG. 3, each virtual PTP bridge 149-2 and 149-4 has one downstream bus connected to their respective egress ports. But, in other embodiments, the I/O elements 132 may include a hierarchy of virtual PTP bridges 149, in which a particular virtual PTP bridge 149 has multiple downstream PTP bridges 149 and/or buses. The MMIO bus address range field 514 specifies a beginning (lower bound or memory base address) of the range and an end (upper bound or memory limit address) of the range.

The values in the MMIO bus address range field 514 are unique within the compute element 100-2 that assigns them, but are not necessarily unique within a south chip 143 or across all south chips 143.

Thus, the routing table 145-2A represents mappings or translations of MMIO bus address ranges 514, secondary bus identifiers 511, and subordinate bus identifiers 512 used by the compute element 100-2 to virtual PTP bridge identifiers 509 that identify virtual PTP bridges 149 that are contained within south chips identified by the chip identifiers 510, in the same row. Thus, the MMIO bus address range 514, the secondary bus identifier 511, and the subordinate bus identifier 512 are assigned to the virtual PTP bridge identifier 509 and the south chip identifier 510 in the same entry.

The example entry 501 in the routing table 145-2A comprises data that indicates that the south chip 143-1 identified by the value "Chip C" in the south chip identifier field 510 comprises a virtual PTP bridge 149-2 identified by the value "PTP B" in the virtual PTP bridge identifier field 509 that is assigned a secondary bus identifier 511 of "Bus B," a subordinate bus identifier 512 of "Bus B," and an MMIO bus address range 514 of 0x1000-0x1FFF.

The device 160-2 is connected to the virtual PTP bridge 149-2 identified by the virtual PTP bridge identifier 509 of "PTP B" via a bus whose bus identifier is encompassed by or falls within the range of bus identifiers specified by the secondary bus identifier 511 of "Bus B" and the subordinate bus identifier 512 of "Bus B." The virtual PTP bridge 149-2 identified by the virtual PTP bridge identifier 509 of "PTP B" forwards configuration commands that specify a bus identifier encompassed by the range of the secondary bus identifier 511 of "Bus B" and the subordinate bus identifier 512 of "Bus B" to the buses, PTP bridges, and devices 160 that are downstream from the virtual PTP bridge "PTP B." The virtual PTP bridge 149-2 identified by the virtual PTP bridge identifier 509 of "PTP B" forwards MMIO commands that specify an MMIO address encompassed by the MMIO bus address range 514 of 0x1000-0x1FFF to the buses, PTP bridges, and devices 160 that are downstream from the virtual PTP bridge "PTP B."

Thus, in response to the CPU 101-8 issuing a read/write command from/to a MMIO address within or encompassed by the range of 0x1000 through 0x1FFF, the north chip 137-2 finds the MMIO bus address range 514 in the entry 501 that encompasses the MMIO address specified by the read/write command and sends the read/write command to the device 160-2 that is connected via the Bus B to the virtual PTP bridge B 149-2 in the south chip C 143-1 and does not send the command to other devices.

The example entry 502 in the routing table 145-2A comprises data that indicates that the south chip 143-2 identified by the value "Chip D" in the south chip identifier field 510 comprises a virtual PTP bridge 149-4 identified by the value "PTP D" in the virtual PTP bridge identifier field 509 that is assigned a secondary bus identifier 511 of "Bus D," a subordinate bus identifier 512 of "Bus D," and an MMIO bus address range 514 of 0x3000-0x3FFF.

A device 160-4 is connected to the virtual PTP bridge 149-4 identified by the virtual PTP bridge identifier 509 of "PTP D" via a bus whose bus identifier is encompassed by or falls within the range of bus identifiers specified by the secondary bus identifier 511 of "Bus D" and the subordinate bus identifier 512 of "Bus D." The virtual PTP bridge 149 identified by the virtual PTP bridge identifier 509 of "PTP D" forwards configuration commands that specify a bus identifier encompassed by the range of the secondary bus identifier 511 of "Bus D" and the subordinate bus identifier 512 of "Bus D" to the buses, virtual PTP bridges 149, and devices 160 that are downstream from the virtual PTP bridge "PTP D" and does not forward configuration commands downstream whose bus identifier is not encompassed by the range. The virtual PTP bridge 149 identified by the virtual PTP bridge identifier 509 of "PTP D" forwards MMIO commands that specify an MMIO address encompassed by the MMIO bus address range 514 of 0x3000-0x3FFF to the buses, virtual PTP bridges 149, and devices 160 that are downstream from the virtual PTP bridge "PTP D" and does not forward MMIO commands downstream whose MMIO address is not encompassed by the range.

Thus, in response to the CPU 101-8 issuing a read/write command from/to a MMIO address within or encompassed by the range of 0x3000 through 0x3FFF, the north chip 137-2 finds the MMIO bus address range 514 in the entry 502 that encompasses the MMIO address specified by the read/write command and sends the read/write command to the device 160-4 that is connected via the bus D to the virtual PTP bridge D 149-4 in the south chip D 143-2 and does not send the command to other devices.

FIG. 6 depicts a block diagram of an example data structure for a routing table 145-1B in the origin compute element, after the movement of the ownership of a device from the origin compute element to the destination compute element, according to an embodiment of the invention. The routing table 145-1B is an example of, and is generically referred to by the routing table 145-1 (FIG. 3).

The routing table 145-1B comprises an example entry 601, which includes a virtual PTP bridge identifier field 609 (analogous to the virtual bridge identifier field 409), a south chip identifier field 610 (analogous to the south chip identifier field 410), a secondary bus identifier field 611 (analogous to the secondary bus identifier field 411), a subordinate bus identifier field 612 (analogous to the subordinate bus identifier field 412), and an MMIO bus address range field 614 (analogous to the MMIO bus address range field 414).

The entry 601 is identical to the entry 401 in FIG. 4 because the ownership of the device 160-1 has not changed and remains assigned to the compute element 100-1. The entry 402, which was present in FIG. 4, is missing in FIG. 6 because the target device 160-3 has changed ownership from the compute element 100-1 to the compute element 100-2. After the movement of the ownership of the target device 160-3 from the origin compute element, the north chip 137-1 no longer sends commands from the origin compute element 100-1 to the target device 160-3 because the target virtual PTP bridge identifier of "PTP C," which identifies the target device 160-3, is no longer in the routing table 145-1B. Thus, FIGS. 4 and 6 illustrate that the management controller removes, from the origin compute element, the translation of a virtual bridge identifier to a bus identifier, a subordinate bus identifier, and a MMIO bus address range, for the target device.

FIG. 7 depicts a block diagram of an example data structure for a routing table 145-2B in the destination compute element, after the movement of the ownership of a device from the origin compute element to the destination compute element, according to an embodiment of the invention. The routing table 145-2B is an example of, and is generically referred to by the routing table 145-2 (FIG. 3). The routing table 145-2B comprises example entries 701, 702, and 703, each of which comprises a virtual PTP bridge identifier field 709 (analogous to the virtual bridge identifier field 509), a south chip identifier field 710 (analogous to the south chip identifier field 510), a secondary bus identifier field 711 (analogous to the secondary bus identifier field 511), a subordinate bus identifier field 712 (analogous to the subordinate bus identifier field 512), and an MMIO bus address range field 714 (analogous to the MMIO bus address range field 514).

The data values in the entries 701 and 702 are identical to the entries 501 and 502 in FIG. 5 because the ownership of the devices 160-2 and 160-4 has not changed and remains assigned to the compute element 100-2. The entry 703, which is present in FIG. 7, is analogous to the unused entry 503 in FIG. 5 because the device 160-3, which was previously assigned to the compute element 100-1 (as illustrated by the entry 402 in FIG. 4) has changed ownership from the compute element 100-1 to the compute element 100-2, so the values in the entry 703 are added to the previously unused entry 503. The data values in the row 703 for the secondary bus identifier 711, the subordinate bus identifier 712, and the MMIO bus address range 714 may be the same or different from the row 402 because the compute elements 100-1 and 100-2 assign their secondary bus identifiers, subordinate bus identifiers, and MMIO bus address ranges independently from each other.

After the movement of the ownership of the target device 160-3 from the origin compute element to the destination compute element, the north chip 137-2 begins sending commands from the destination compute element 100-2 to the target device 160-3 because the target virtual PTP bridge identifier of "PTP C" (entry 703) that identifies the target device 160-3 is now in the routing table 145-2B. Thus, FIGS. 5 and 7 illustrate that the management controller adds, to the destination compute element, the translation of a virtual bridge identifier to a bus identifier, a subordinate bus identifier, and a MMIO bus address range, for the target device.

Figure 8:
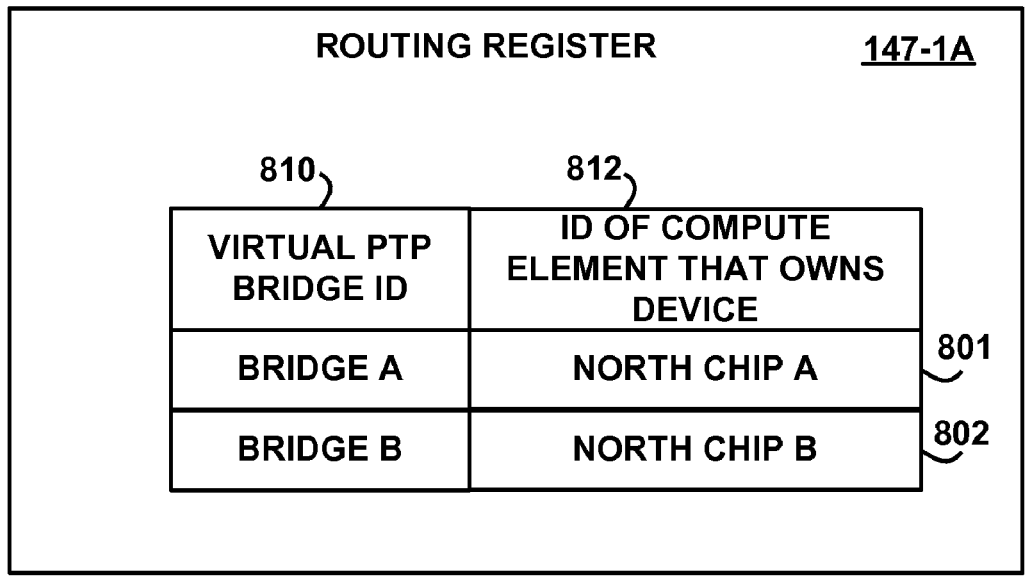
FIG. 8 depicts a block diagram of an example data structure for a routing register in a non-target south chip that does not comprise a target virtual bridge, prior to the movement of the ownership of a device from the origin compute element to the destination compute element, according to an embodiment of the invention.

FIG. 8 depicts a block diagram of an example data structure for a routing register 147-1A in a non-target south chip that does not comprise a target virtual PTP bridge, prior to the movement of the ownership of a target device connected to the target virtual PTP bridge from the origin compute element to the destination compute element, according to an embodiment of the invention. The routing register 147-1A is an example of, and is generically referred to by, the routing register 147-1 (FIG. 3).

The routing register 147-1A comprises example entries 801 and 802, each of which comprises a virtual PTP bridge identifier field 810 and an identifier 812 of a compute element 100 or north chip 137 that owns or is assigned the device that is connected to the virtual PTP bridge identified by the virtual PTP bridge identifier 810 in the same entry. The south chip 143-1 that comprises the routing register 147-1A sends commands, requests, responses, and data from the device that is connected to the virtual PTP bridge identified by the virtual PTP bridge identifier 810 to the compute element 100 or north chip 137 that is identified by the identifier 812 in the same entry and does not send the commands, requests, and responses from that device to other compute elements.

The example entry 801 specifies a virtual PTP bridge identifier 810 of "Bridge A," which identifies the virtual PTP bridge 149-1 and an identifier 812 of "North Chip A," which identifies the compute element 100-1 and the north chip 137-1. In response to a command, request, response, or data from the device 160-1 that is connected to the virtual PTP bridge 149-1, the south chip 143-1 finds the virtual PTP bridge identifier 810 that matches the virtual PTP bridge identifier of the virtual PTP bridge 149-1 that is assigned to the port and bus via which the command, request, response, or data is received, reads the identifier 812 of "North Chip A" in the same entry as the virtual PTP bridge identifier 810 of "Bridge A," and in response sends the command, request, response, or data to the north chip 137-1 and compute element 100-1 identified by the identifier 812 in the same entry 801.

The example entry 802 specifies a virtual PTP bridge identifier 810 of "Bridge B," which identifies the virtual PTP bridge 149-2 and an identifier 812 of "North Chip B," which identifies the north chip 137-2. In response to a command, request, response, or data from the device 160-2 that is connected to the virtual PTP bridge 149-2, the south chip 143-1 finds the virtual PTP bridge identifier 810 that matches the virtual PTP bridge identifier of the virtual PTP bridge 149-2 that is assigned to the port and bus via which the command, request, response, or data is received, reads the identifier 812 of "North Chip B" in the same entry as the virtual PTP bridge identifier 810 of "Bridge B," and in response sends the command, request, response, or data to the north chip 137-2 and compute element 100-2 identified by the identifier 812 in the same entry 802.

Figure 9:
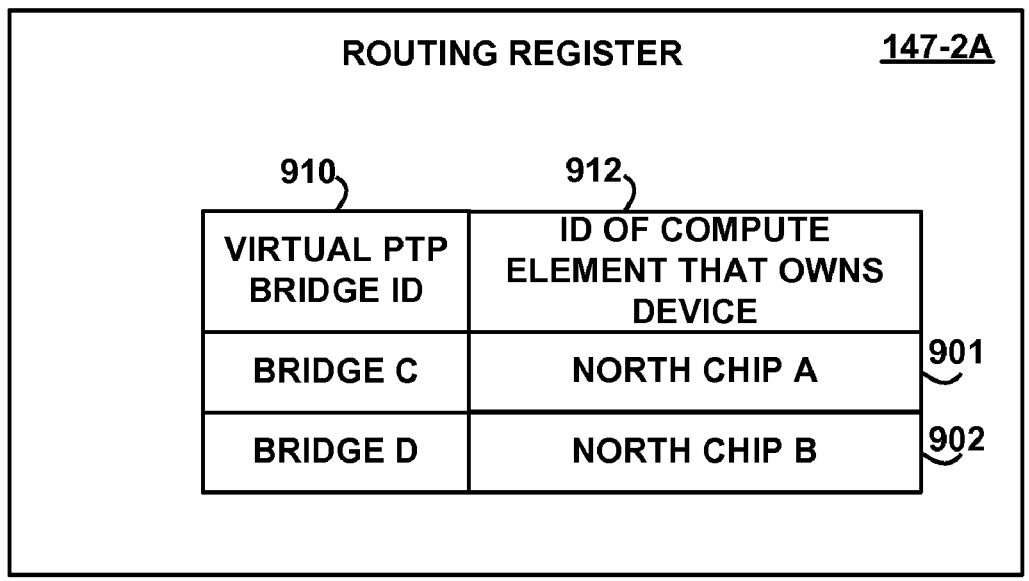
FIG. 9 depicts a block diagram of an example data structure for a routing register in a target south chip that comprises a target virtual bridge that connects to the device, prior to the movement of the ownership of the device from the origin compute element to the destination compute element, according to an embodiment of the invention.

FIG. 9 depicts a block diagram of an example data structure for a routing register 147-2A in a target south chip that comprises a target virtual PTP bridge that connects to the target device, prior to the movement of the ownership of the target device from the origin compute element to the destination compute element, according to an embodiment of the invention. The routing register 147-2A is an example of, and is generically referred to by, the routing register 147-2 (FIG. 3).

The routing register 147-2A comprises example entries 901 and 902, each of which comprises a virtual PTP bridge identifier field 910 and an identifier 912 of a compute element 100 or north chip 137 that owns or is assigned the device that is connected to the virtual PTP bridge identified by the virtual PTP bridge identifier 910 in the same entry. The south chip 143-2 that comprises the routing register 147-2A sends commands, requests, responses, and data from the device that is connected to the virtual PTP bridge identified by the virtual PTP bridge identifier 910 to the compute element 100 and north chip 137 identified by the identifier 912 in the same entry.

The example entry 901 specifies a virtual PTP bridge identifier 910 of "Bridge C," which identifies the virtual PTP bridge 149-3 and an identifier 912 of "North Chip A," which identifies the compute element 100-1 and the north chip 137-1. In response to a command, request, response, or data from the device 160-3 that is connected to the virtual PTP bridge 149-3, the south chip 143-2 finds the virtual PTP bridge identifier 910 that matches the virtual PTP bridge identifier that identifies the virtual PTP bridge 149-3 that is assigned to the port and bus via which the command, request, response, or data is received, reads the identifier 912 of "North Chip A" in the same entry 901 as the virtual PTP bridge identifier 910 of "Bridge C," and in response sends the command, request, response, or data to the compute element 100-1 and the north chip 137-1 identified by the identifier 912 in the same entry 901 and does not send the command, request, response, or data to other compute elements.

The example entry 902 specifies a virtual PTP bridge identifier 910 of "Bridge D," which identifies the virtual PTP bridge 149-4 and an identifier 912 of "North Chip B," which identifies the compute element 100-2 and the north chip 137-2. In response to a command, request, response, or data from the device 160-4 that is connected to the virtual PTP bridge 149-4, the south chip 143-2 finds the virtual PTP bridge identifier 910 that matches the virtual PTP bridge identifier that identifies the virtual PTP bridge 149-4 that is assigned to the port and bus via which the command, request, response, or data is received, reads the identifier 912 of "North Chip B" in the same entry 902 as the virtual PTP bridge identifier 910 of "Bridge D," and in response sends the command, request, response, or data to the compute element 100-2 and the north chip 137-2 identified by the identifier 912 in the same entry 902.

Figure 10:
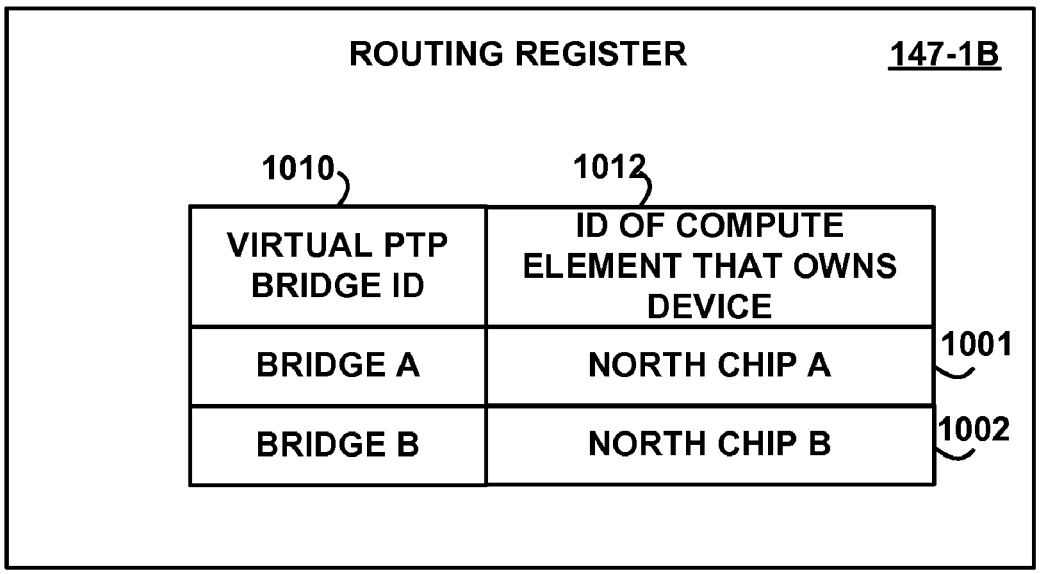
FIG. 10 depicts a block diagram of an example data structure for a routing register in a non-target south chip that does not comprise the target virtual bridge, after the movement of the ownership of a device from the origin compute element to the destination compute element, according to an embodiment of the invention.

FIG. 10 depicts a block diagram of an example data structure for a routing register 147-1B in the non-target south chip that does not comprise the target virtual PTP bridge, after the movement of the ownership of a target device connected to the target virtual PTP bridge from the origin compute element to the destination compute element, according to an embodiment of the invention. The routing register 147-1B is an example of, and is generically referred to by, the routing register 147-1 (FIG. 3).

The example routing register 147-1B comprises example entries 1001 and 1002, each of which comprises a virtual PTP bridge identifier 1010 and an identifier 1012. The entries 1001 and 1002 are identical to the entries 801 and 802 in FIG. 8 because the south chip 143-1 does not comprise the target virtual PTP bridge whose ownership is moved between compute elements, so the routing register 147-1 is not modified as part of the ownership move.

Figure 11:
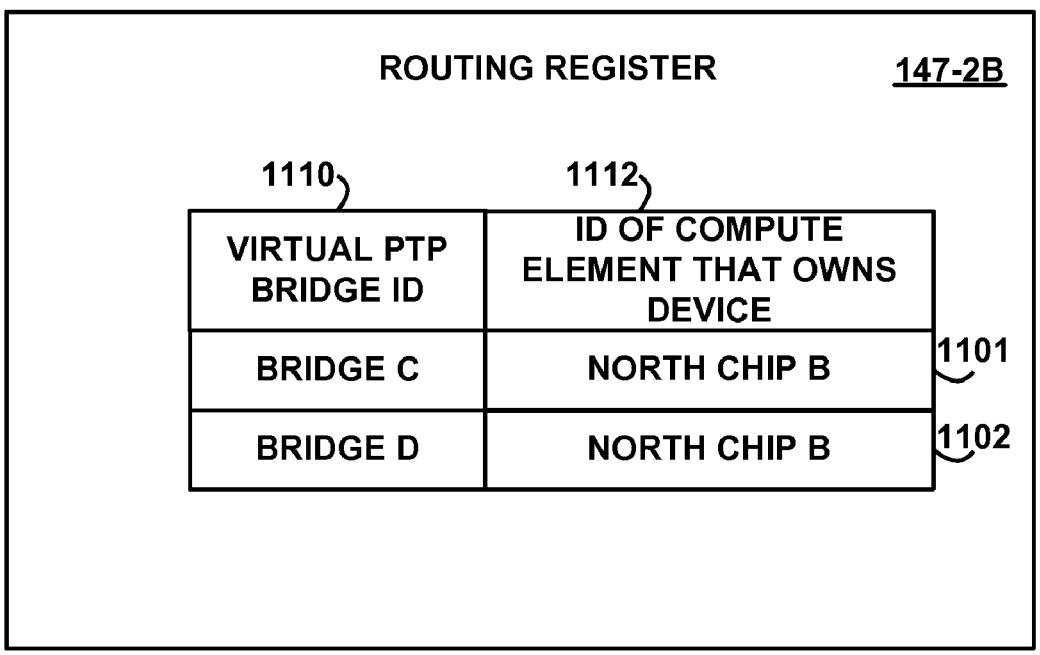
FIG. 11 depicts a block diagram of an example data structure for a routing register in a target south chip that comprises the target virtual bridge that connects to the device, after the movement of the ownership of a device from the origin compute element to the destination compute element, according to an embodiment of the invention.

FIG. 11 depicts a block diagram of an example data structure for a routing register 147-2B in a target south chip that comprises the target virtual PTP bridge that connects to the target device, after the movement of the ownership of the target device from the origin compute element to the destination compute element, according to an embodiment of the invention. The routing register 147-2B is an example of, and is generically referred to by, the routing register 147-2 (FIG. 3).

The example routing register 147-2B comprises example entries 1101 and 1102, each of which comprises a virtual PTP bridge identifier 1110 and an identifier 1112. The entry 1101 contains a value in the identifier field 1112 that identifies the compute element 100-2 and the north chip B 137-2, which is different than the value in the identifier field 912 in the entry 901 of the routing register 147-2A in FIG. 9 because the ownership of the device 160-3 that is connected to virtual PTP bridge 149-3 identified by the value "Bridge C" in the virtual PTP bridge identifier field 1112 has been moved from the compute element 100-1 to the compute element 100-2. After the ownership move, in response to a command, request, response, or data from the device 160-3 that is connected to the virtual PTP bridge 149-3, the south chip 143-2 finds the virtual PTP bridge identifier 1110 that matches the virtual PTP bridge identifier of the virtual PTP bridge 149-3 that is assigned to the port and bus via which the command, request, response, or data is received, reads the identifier 1112 of "North Chip B" in the same entry as the virtual PTP bridge identifier 910 of "Bridge C," and in response sends the command, request, response, or data to the compute element 100-2 and the north chip 137-2 identified by the identifier 1112 in the same entry 1101. Thus, as illustrated in FIGS. 9 and 11, the south chip 143-2 sends commands, requests, responses, and data to the origin compute element 100-1 and north chip 137-1 prior to the move of the ownership of the target device 160-3 and sends the commands, requests, responses and data to the destination compute element 100-2 and north chip 137-2 after the move of the ownership of the target device. Thus, by changing the value of the identifier field 1112 in the row 1102, the management controller removes, from a target south chip that comprises the target virtual bridge, a translation, mapping or assignment of the target virtual bridge identifier to an identifier of the origin north chip and the origin compute element and adds, into the target south chip, a translation, mapping, or assignment of the target virtual bridge identifier to an identifier of the destination north chip and the destination compute element.

The entry 1102 is identical to the entry 902 in FIG. 9 because the ownership of the device 160-4 that is connected to the virtual PTP bridge 149-4 identified by the value in the virtual PTP bridge identifier field 1110 has not been moved from the compute element 100-2 that comprises the north chip B 137-2.

FIG. 12 depicts a block diagram of an example data structure for a configuration space 222-1A in an origin north chip and origin compute element, prior to the movement of the ownership of a target device from the origin compute element to the destination compute element, according to an embodiment of the invention. The configuration space 222-1A is an example of, and is generically referred to by, the configuration space 222-1 (FIG. 3).

The configuration space 222-1A comprises example entries 1201, 1202, 1203, and 1204, each of which comprises an example slot status field 1210 and an example virtual PTP bridge identifier field 1211. The slot status field 1210 indicates the status (e.g., an indication of enabled or disabled) of the virtual PTP bridge (in a south chip 143) identified by the virtual PTP bridge identifier 1211. A slot status that indicates enabled specifies that the ownership of the virtual PTP bridge and the device that is connected to the virtual PTP bridge is assigned to the compute element 100-1 that comprises the configuration space 222-1A. In response to reading the slot status 1210 that indicates enabled, the compute element 100-1 may send commands to the device connected to the virtual PTP bridge identified by the virtual PTP bridge identifier 1211 in the same entry. A slot status 1210 that indicates disabled specifies that ownership of the virtual PTP bridge and the connected device identified by the virtual PTP bridge identifier 1211 in the same entry is not assigned to the compute element 100-1. In response to reading slot status 1210 that indicates disabled, the compute element 100-1 refrains from sending commands, requests, or data to the device connected to the virtual PTP bridge identified by the virtual PTP bridge identifier 1211 in the same entry.

The example values in the configuration space 222-1A indicate that the virtual PTP bridge identified by the virtual PTP bridge identifier PTP A is enabled (entry 1201), the virtual PTP bridge identified by the virtual PTP bridge identifier PTP B is disabled (entry 1202), the virtual PTP bridge identified by the virtual PTP bridge identifier PTP C is enabled (entry 1203), and the virtual PTP bridge identified by the virtual PTP bridge identifier PTP D is disabled (entry 1204). Thus, ownership of the virtual PTP bridges 149-1 and 149-3 is assigned to the compute element 100-1, and ownership of the virtual PTP bridges 149-2 and 149-4 is not assigned to the compute element 100-1.

FIG. 13 depicts a block diagram of an example data structure for a configuration space 222-2A in a destination north chip and destination compute element, prior to the movement of the ownership of a target device from the origin compute element to the destination compute element, according to an embodiment of the invention. The configuration space 222-2A is an example of, and is generically referred to by, the configuration space 222-2 (FIG. 3). The configuration space 222-2A comprises example entries 1301, 1302, 1303, and 1304, each of which comprises an example slot status field 1310 and an example virtual PTP bridge identifier field 1311, which have a description analogous to the description of the slot status 1210 and 1211 of FIG. 12.

In response to reading the slot status 1310 that indicates enabled, the compute element 100-2 may send commands to the device connected to the virtual PTP bridge identified by the virtual PTP bridge identifier 1311 in the same entry. In response to reading slot status 1310 that indicates disabled, the compute element 100-2 refrains from sending commands, requests, or data to the device connected to the virtual PTP bridge identified by the virtual PTP bridge identifier 1311 in the same entry.

The example values in the configuration space 222-2A indicate that the virtual PTP bridge identified by the virtual PTP bridge identifier PTP A is disabled (entry 1301), the virtual PTP bridge identified by the virtual PTP bridge identifier PTP B is enabled (entry 1302), the virtual PTP bridge identified by the virtual PTP bridge identifier PTP C is disabled (entry 1303), and the virtual PTP bridge identified by the virtual PTP bridge identifier PTP D is enabled (entry 1304). Thus, ownership of the virtual PTP bridges 149-2 and 149-4 is assigned to the compute element 100-2, and ownership of the virtual PTP bridges 149-1 and 149-3 is not assigned to the compute element 100-2.

Figure 14:
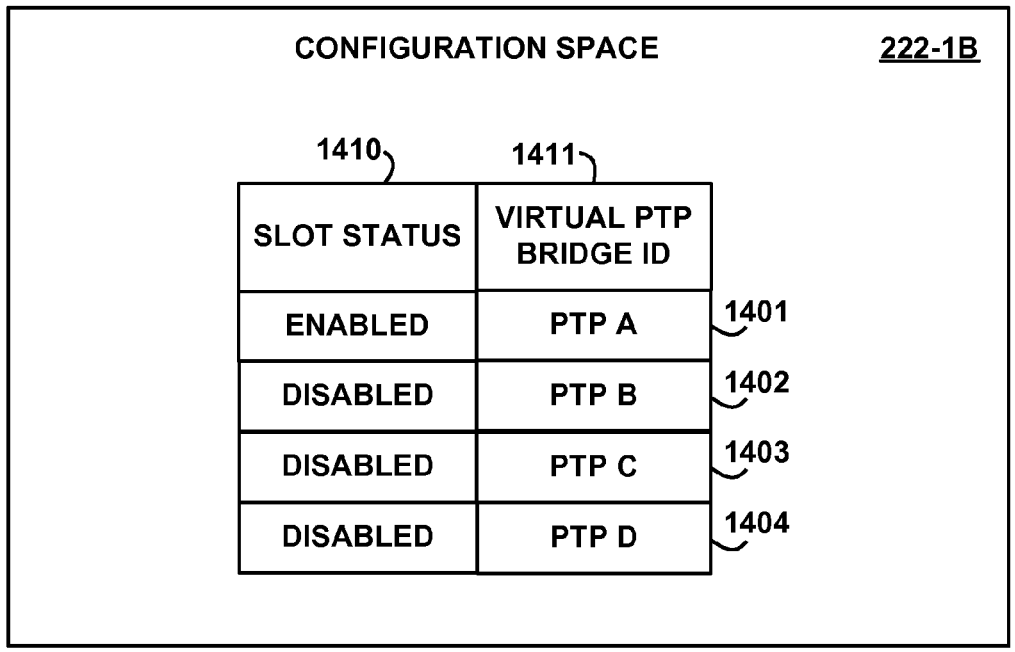
FIG. 14 depicts a block diagram of an example data structure for a configuration space in an origin north chip, after the movement of the ownership of a device from the origin compute element to the destination compute element, according to an embodiment of the invention.

FIG. 14 depicts a block diagram of an example data structure for a configuration space 222-1B in an origin north chip in an origin compute element, after the movement of the ownership of a target device from the origin compute element to the destination compute element, according to an embodiment of the invention. The configuration space 222-1B is an example of, and is generically referred to by, the configuration space 222-1 (FIG. 3). The configuration space 222-1B comprises example entries 1401, 1402, 1403, and 1404, each of which comprises an example slot status field 1410 and an example virtual PTP bridge identifier field 1411, which have an analogous description as the description for the fields 1210 and 1211 of FIG. 12.

The example values in the configuration space 222-1B indicate that the virtual PTP bridge identified by the virtual PTP bridge identifier PTP A is enabled (entry 1401), the virtual PTP bridge identified by the virtual PTP bridge identifier PTP B is disabled (entry 1402), the virtual PTP bridge identified by the virtual PTP bridge identifier PTP C is disabled (entry 1403), and the virtual PTP bridge identified by the virtual PTP bridge identifier PTP D is disabled (entry 1404). Thus, the slot status 1410 of the virtual PTP bridge 149-3 which had been enabled in entry 1203 of FIG. 12 is now disabled in entry 1403 of FIG. 14, indicating that ownership of the virtual PTP bridge 149-3 and its connected device have been moved away from the compute element 100-1. In response to reading the slot status 1410 that indicates disabled for the virtual PTP bridge 149-3 identified by the virtual PTP bridge identifier 1411 in entry 1403, the compute element 100-1 no longer sends commands, requests, or data to the virtual PTP bridge 149-3.

Figure 15:
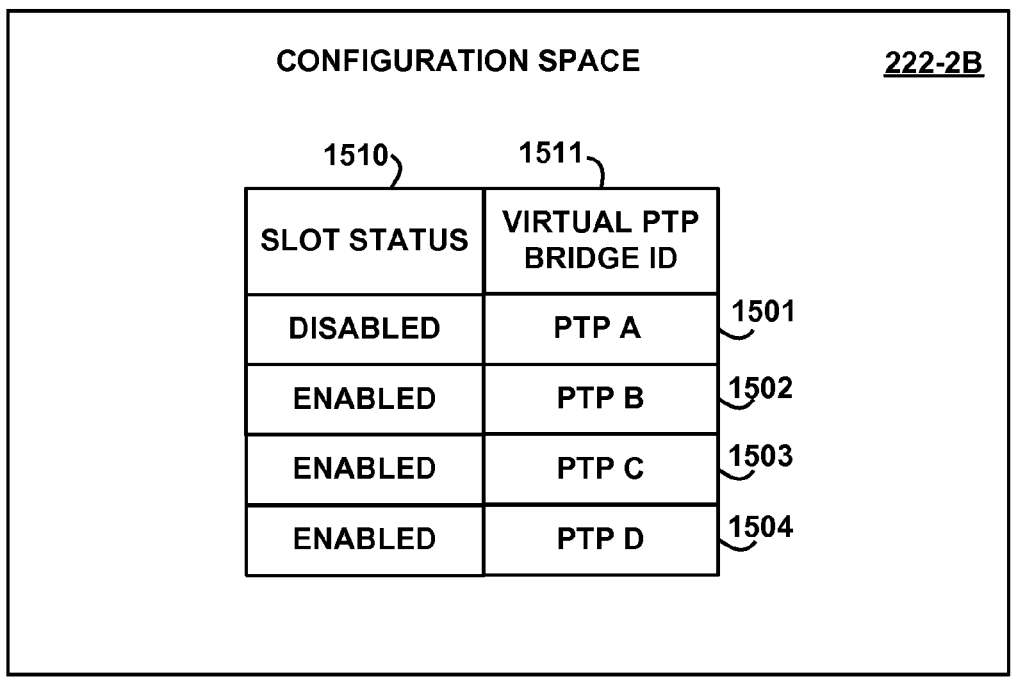
FIG. 15 depicts a block diagram of an example data structure for a configuration space in a destination north chip, after the movement of the ownership of a device from the origin compute element to the destination compute element, according to an embodiment of the invention.

FIG. 15 depicts a block diagram of an example data structure for a configuration space 222-2B in a destination north chip in a destination compute element, after the movement of the ownership of a target device from the origin compute element to the destination compute element, according to an embodiment of the invention. The configuration space 222-2B is an example of, and is generically referred to by, the configuration space 222-2 (FIG. 3). The configuration space 222-2B comprises example entries 1501, 1502, 1503, and 1504, each of which comprises an example slot status field 1510 and an example virtual PTP bridge identifier field 1511, which have an analogous description as the description for the fields 1310 and 1311 of FIG. 13.

The example values in the configuration space 222-2B indicate that the virtual PTP bridge identified by the virtual PTP bridge identifier PTP C is enabled (entry 1503). Thus, the slot status 1510 of the virtual PTP bridge 149-3 which had been disabled in entry 1303 of FIG. 13 is now enabled in entry 1503 of FIG. 15, indicating that ownership of the virtual PTP bridge 149-3 and its connected device has been moved to the compute element 100-2. In response to reading the slot status 1510 that indicates enabled for the virtual PTP bridge 149-3 identified by the virtual PTP bridge identifier 1511 in the entry 1503, the compute element 100-2 may start sending commands, requests, or data to the virtual PTP bridge 149-3.

Figure 16:
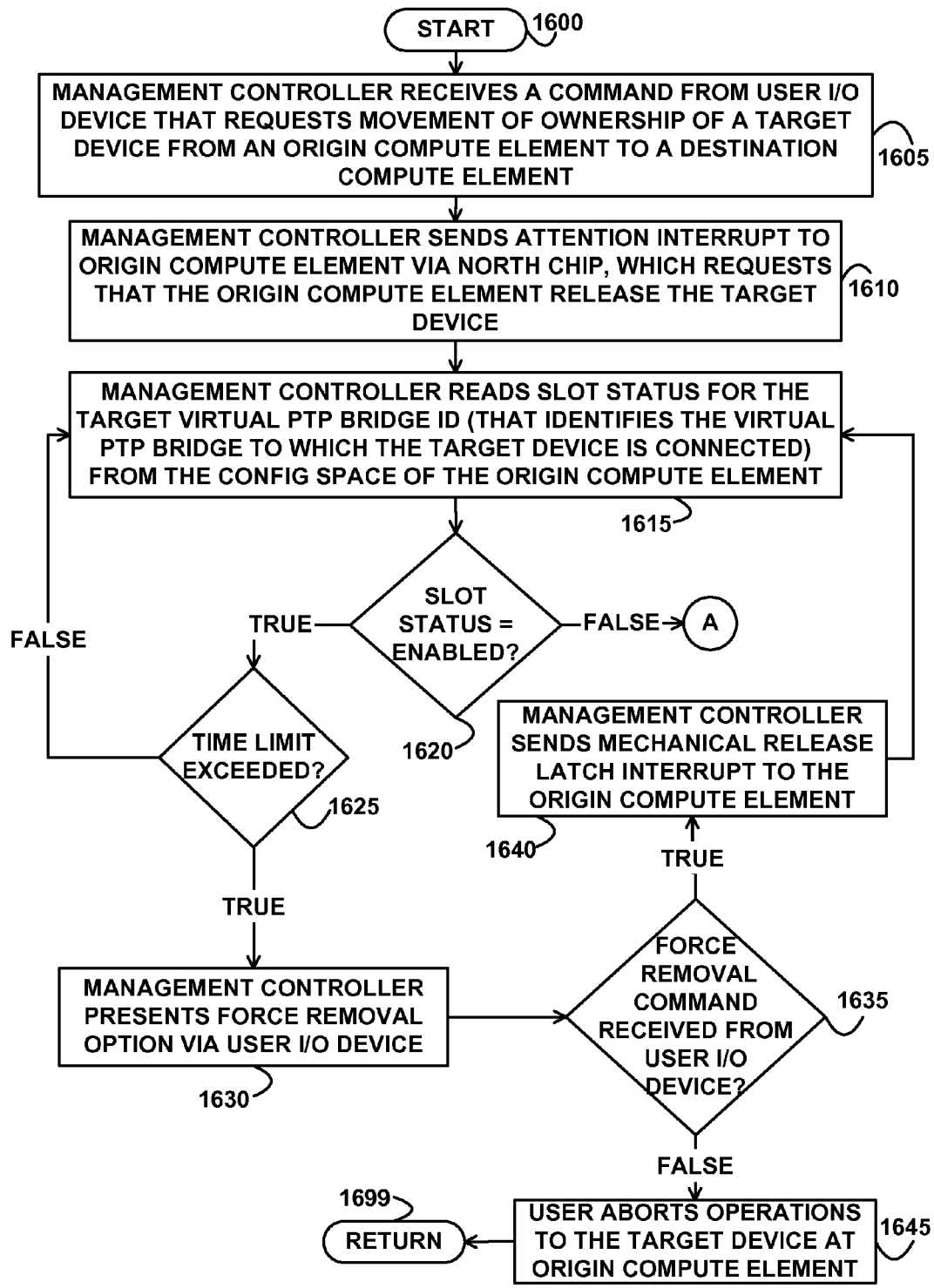
FIG. 16 depicts a flowchart of example processing for moving the ownership of the device from the origin compute element to the destination compute element, according to an embodiment of the invention.
Figure 17:
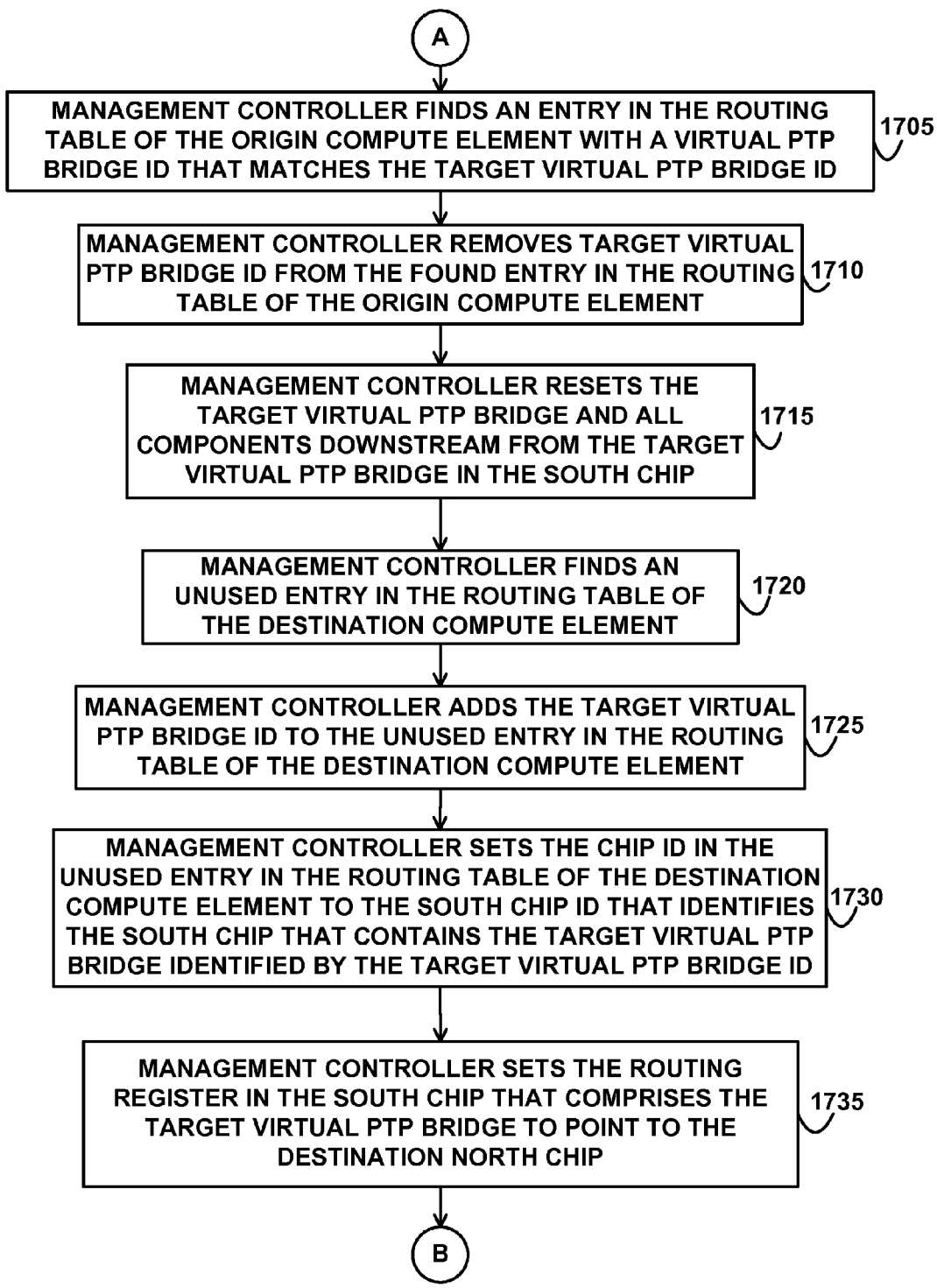
FIG. 17 depicts a flowchart of further example processing for moving the ownership of the device from the origin compute element to the destination compute element, according to an embodiment of the invention.

FIG. 16 depicts a flowchart of example processing for moving the ownership of a device from the origin compute element to the destination compute element, according to an embodiment of the invention. Control begins at block 1600.

Control then continues to block 1605 where the management controller 141 receives a command from the user I/O device 190 that requests movement of ownership of a target device from an origin compute element to a destination compute element. In an embodiment, the command identifies the target device via a device identifier, via a virtual PTP bridge identifier that identifies the virtual PTP bridge to which the target device is connected, via a bus identifier that identifies the bus via which the target device is connected to the virtual PTP bridge, or any combination thereof. The command identifies the origin compute element and the destination compute element via respective identifiers. In the example of FIG. 3, the origin compute element is the compute element 100-1, the destination compute element is the compute element 100-2, and the target device is the device 160-3.

Control then continues to block 1610 where the management controller 141 sends an attention interrupt to the origin compute element via the north chip 137 in the origin compute element. The attention interrupt requests that the origin compute element halt the sending of operations, commands, or data to the target device and release the target device. The origin compute element receives the attention interrupt and begins releasing the target device. Control then continues to block 1615 where the management controller 141 reads the slot status 1210 or 1410 (from entry 1203 or 1403) for the target virtual PTP bridge identifier (that identifies the target virtual PTP bridge to which the target device is connected) from the configuration space 222-1A or 222-1B of the origin compute element.

Control then continues to block 1620 where the management controller 141 determines whether the slot status 1210 or 1410 indicates that the origin compute element has operations to the target device currently enabled. If the determination at block 1620 is true, then operations to the target device are still currently enabled and the origin compute element has not finished halting and aborting operations to the target device and has not yet changed the slot status to indicated disabled, so control continues to block 1625 where the management controller 141 determines whether a time limit since the management controller sent the attention interrupt has been exceeded. If the determination at block 1625 is true, then the time limit has been exceeded, so control continues to block 1630 where the management controller 141 presents or displays a force removal option via the user I/O device 190.

Control then continues to block 1635 where the management controller 141 determines whether a force removal command has been received from the user I/O device 190. If the determination at block 1635 is true, then a force removal command has been received from the user I/O device 190, so control continues to block 1640 where the management controller 141 sends a mechanical release latch interrupt to the origin compute element. The mechanical release latch interrupt informs the origin compute element that a mechanical release lever or button on the target device or mounting chassis that houses the target device has been activated, moved, pressed, or disengaged, meaning that the target device is unlocked from the mounting chassis and is capable of being physically disconnected from its slot and/or port. Although the management controller 141 sends this mechanical release latch interrupt, the mechanical release has not actually been moved, and the target device is not actually unlocked from its mounting chassis. Control then returns to block 1615, where the management controller 141 again reads the slot status, as previously described above.

If the determination at block 1635 is false, then a force removal command was not received from the user I/O device 190, so control continues to block 1645 where the user aborts or stops operations from being sent from the origin compute element to the target device. (If the user chooses, the user may then reissue the movement command.) Control then continues to block 1699 where the logic of FIG. 16 returns.

If the determination at block 1625 is false, then the time limit has not been exceeded, so control returns to block 1615, where the management controller 141 again reads the slot status, as previously described above.

If the determination at block 1620 is false, then the slot status indicates disabled. The origin compute element 100-1 sets the slot status for the target device to indicate disabled in response to the origin compute element 100-1 finishing the halting of operations to the target device. Control then continues to block 1705 of FIG. 17 where the management controller 141 finds an entry (entry 402 in the example of FIG. 4) in the routing table 145-1A of the origin compute element with a virtual PTP bridge identifier 409 that matches the target virtual PTP bridge identifier, which identifies the target virtual PTP bridge, to which the target device is connected.

Control then continues to block 1710 where the management controller 141 removes the found target virtual PTP bridge identifier from the found entry (or removes the found entry) in the routing table 145-1 of the origin compute element, yielding the routing table 145-1B, in the example of FIG. 6.

Control then continues to block 1715 where the management controller 141 resets the target virtual PTP bridge and all components (e.g., all virtual bridges, bridges, and devices) downstream from the target virtual PTP bridge in the target south chip 143-2 that is identified by the south chip identifier 610 in the same entry of the routing table 145-1B as the target virtual PTP bridge identifier. In an embodiment, the management controller 141 sends a reset command that identifies the target virtual PTP bridge identifier to the target south chip 143, and receipt of the reset command causes the target virtual PTP bridge to halt or abort all commands, operations, or data transfers to and from the target virtual PTP bridge and to cause the target virtual PTP bridge to forward the reset command downstream to all downstream components (connected directly or indirectly to the target virtual PTP bridge) which also halt or abort all commands, operations, or data transfers to and from those components. Components that are not downstream from the target virtual PTP bridge do not halt or abort their commands, operations, and data transfers.

Control then continues to block 1720 where the management controller 141 finds an unused entry in the routing table 145-2A of the destination compute element, such as the example unused entry 503. Control then continues to block 1725 where the management controller 141 adds the target virtual PTP bridge identifier to the virtual bridge identifier field in the unused entry in the routing table 145 of the destination compute element, yielding the example value "PTP C" in the virtual PTP bridge identifier field 709 in the entry 703 of the routing table 145-2B.

Control then continues to block 1730 where the management controller 141 sets the chip identifier in the unused entry in the routing table 145 of the destination compute element to the south chip identifier that identifies the target south chip 143-2 that contains the target virtual PTP bridge identified by the target virtual PTP bridge identifier, yielding the example value "Chip D" in the chip identifier field 710 in the entry 703 of the routing table 145-2B.

Control then continues to block 1735 where the management controller 141 sets the identifier field 1112 in the routing register 147-2B in the south chip 143-2 that comprises the target virtual PTP bridge 149-3 to identify the destination north chip 137-2 and the destination compute element 100-2. In the example of FIG. 11, the management controller 141 sets the identifier 1112 in the entry 1101 to "North Chip B."

Figure 18:
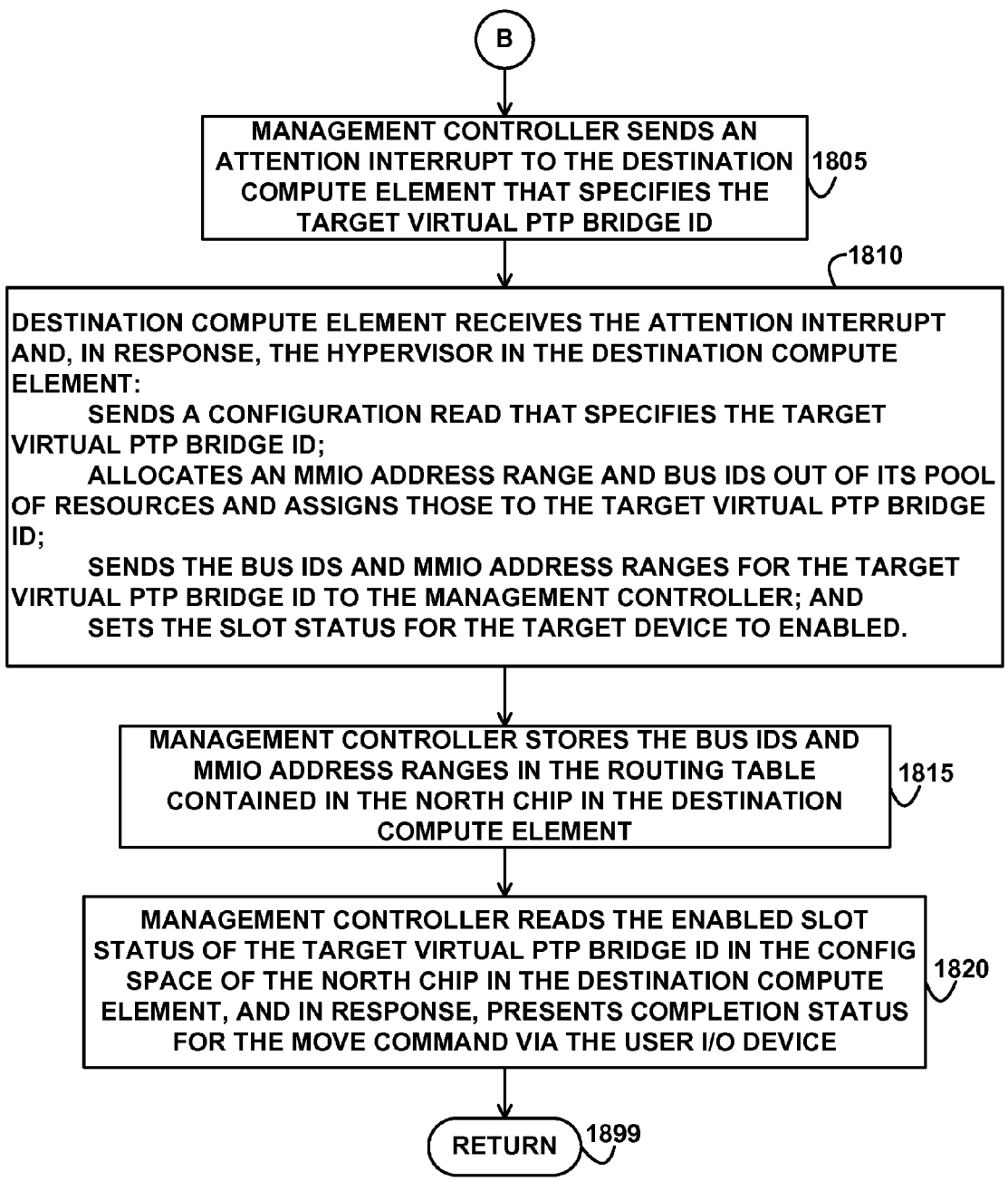
FIG. 18 depicts a flowchart of further example processing for moving the ownership of a device from the origin compute element to the destination compute element.

Control then continues to block 1805 of FIG. 18 where the management controller 141 sends an attention interrupt to the destination compute element. The attention interrupt specifies the target virtual PTP bridge identifier and authorizes the destination compute element to assume ownership of the target virtual PTP bridge and the target device that is connected to the target virtual PTP bridge.

Control then continues to block 1810 where the destination compute element receives the attention interrupt and, in response, the hypervisor in the destination compute element sends a configuration read (to the north chip 137-2) that specifies the target virtual PTP bridge identifier. The north chip 137-2 reads its routing table 145-2B and compares the target virtual PTP bridge identifier in the configuration read command to the virtual PTP bridge identifier 709 in the routing table 145-2B. If the target virtual PTP bridge identifier matches a virtual PTP bridge identifier 709, the north chip 137-2 reports to the hypervisor that the target virtual PTP bridge identifier is assigned to the hypervisor and compute element, meaning that the hypervisor is allowed to send commands to the target virtual PTP bridge 149-3 identified by that target virtual PTP bridge identifier. If the hypervisor sends a virtual PTP bridge identifier in a configuration read that does not match a virtual PTP bridge identifier 709 in the routing table 145-2B of the north chip 137, the north chip 137-2 reports to the hypervisor that the virtual PTP bridge identifier is not assigned to the hypervisor, meaning that the hypervisor does not send commands to the virtual PTP bridges 149 identified by those non-matching virtual PTP bridge identifiers.

The hypervisor further allocates an MMIO address range and bus identifiers (secondary bus identifiers and subordinate bus identifiers) out of its pool of resources and assigns those to the target virtual PTP bridge identifier. In an embodiment, the hypervisors divide their bus identifiers and MMIO address space resources among the virtual PTP bridges 149 assigned to their compute elements 100, assigning bus identifier ranges and MMIO address ranges to the assigned virtual PTP bridges 149. In an embodiment, the hypervisors divide their bus identifiers by assigning bus identifiers to buses downstream from the virtual PTP bridges 149, in the order in which the buses exist downstream from the virtual PTP bridges 149. In an embodiment, the hypervisors assign MMIO address ranges to the assigned virtual PTP bridges 149 in proportion to the amount of memory in the devices 160 that are connected to the virtual PTP bridges 149 via the buses downstream from the virtual PTP bridges 149.

The hypervisor further sends the assigned bus identifiers and MMIO address ranges for the target virtual PTP bridge identifier to the management controller 141. The hypervisor further sets the slot status 1510 in the entry 1503 in the configuration space 222-2B, which has a virtual PTP bridge identifier 1511 that matches the target virtual PTP bridge identifier to indicate that the slot is enabled.

Control then continues to block 1815 where the management controller 141 receives the bus identifiers and the MMIO address range from the hypervisor, and in response, finds the routing table 145-2B that is contained in the north chip 137-2 that is in the same destination compute element 100-2 as the hypervisor. The management controller 141 then finds the virtual PTP bridge identifier 709 in an entry in that routing table 145-2B that matches the target virtual PTP bridge identifier received from the hypervisor and stores the received bus identifiers into the secondary bus identifier field 711 and the subordinate bus identifier field 712, in the same entry. The management controller 141 further stores, in the same entry, the received MMIO address range into the MMIO address range field 714.

Control then continues to block 1820 where the management controller 141 reads the slot status 1510 (from the example entry 1503) that indicates the target virtual PTP bridge and connected target device are enabled, and in response, presents completion status for the move command via the user I/O device 190. Control then continues to block 1899 were the logic of FIGS. 16, 17, and 18 returns.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of entries, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
   receiving a command that requests movement of ownership of a target device from an origin compute element to a destination compute element;
   removing, from the origin compute element, a translation of a virtual bridge identifier to a first secondary bus identifier, a first subordinate bus identifier, and a first MMIO bus address range, wherein the target virtual bridge identifier identifies a target virtual bridge to which the target device connects;
   adding, to the destination compute element, a translation of the target virtual bridge identifier to a second secondary bus identifier, a second subordinate bus identifier, and a second MMIO bus address range;
   removing, from a south chip that comprises the target virtual bridge, a translation of the target virtual bridge identifier to an identifier of the origin compute element; and
   adding, to the south chip, a translation of the target virtual bridge identifier to an identifier of the destination compute element.

2. The method of claim 1, further comprising:
   in response to the receiving the command, sending a first interrupt to the origin compute element that requests that the origin compute element release the target device.

3. The method of claim 2, further comprising:
   if the origin compute element does not release the target device, sending a mechanical release interrupt to the origin compute element at a time when a mechanical release of the target device has not been activated, wherein the mechanical release interrupt indicates that the mechanical release of the target device has been activated.

4. The method of claim 3, further comprising:
   if the origin compute element does release the target device, performing the removing from the origin compute element, the adding to the destination compute element, the removing from the south chip, and the adding to the south chip.

5. The method of claim 1, wherein the secondary bus identifier identifies a bus that is immediately downstream from the target virtual bridge, wherein the subordinate bus identifier identifies a highest bus identifier of all of buses reachable downstream from the target virtual bridge.

6. The method of claim 1, further comprising:
   resetting the target virtual bridge and all components downstream from the target virtual bridge.

7. The method of clam 1, wherein the origin compute element is connected to the south chip via a first point-to-point connection, and wherein the destination compute element is connected to the south chip via a second point-to-point connection.

8. The method of claim 1, further comprising:
   sending a second interrupt to the destination compute element, wherein the second interrupt specifies the target virtual bridge identifier, and wherein in response to the second interrupt, the destination compute element allocates the second secondary bus identifier, the second subordinate bus identifier, and the second MMIO bus address range.

9. A computer-readable storage medium encoded with instructions, wherein the instructions when executed comprise:
   receiving a command that requests movement of ownership of a target device from an origin compute element to a destination compute element;
   removing, from the origin compute element, a translation of a virtual bridge identifier to a first secondary bus identifier, a first subordinate bus identifier, and a first MMIO bus address range, wherein the target virtual bridge identifier identifies a target virtual bridge to which the target device connects;
   adding, to the destination compute element, a translation of the target virtual bridge identifier to a second secondary bus identifier, a second subordinate bus identifier, and a second MMIO bus address range;
   removing, from a south chip that comprises the target virtual bridge, a translation of the target virtual bridge identifier to an identifier of the origin compute element; and
   adding, to the south chip, a translation of the target virtual bridge identifier to an identifier of the destination compute element.

10. The computer-readable storage medium of claim 9, further comprising:
    in response to the receiving the command, sending a first interrupt to the origin compute element that requests that the origin compute element release the target device.

11. The computer-readable storage medium of claim 10, further comprising:
    if the origin compute element does not release the target device, sending a mechanical release interrupt to the origin compute element at a time when a mechanical release of the target device has not been activated, wherein the mechanical release interrupt indicates that the mechanical release of the target device has been activated.

12. The computer-readable storage medium of claim 11, further comprising:
    if the origin compute element does release the target device, performing the removing from the origin compute element, the adding to the destination compute element, the removing from the south chip, and the adding to the south chip.

13. The computer-readable storage medium of claim 9, wherein the secondary bus identifier identifies a bus that is immediately downstream from the target virtual bridge, wherein the subordinate bus identifier identifies a highest bus identifier of all of buses reachable downstream from the target virtual bridge.

14. The computer-readable storage medium of claim 9, further comprising:
    resetting the target virtual bridge and all components downstream from the target virtual bridge.

15. The computer-readable storage medium of clam 9, wherein the origin compute element is connected to the south chip via a first point-to-point connection, and wherein the destination compute element is connected to the south chip via a second point-to-point connection.

16. The computer-readable storage medium of claim 9, further comprising:
    sending a second interrupt to the destination compute element, wherein the second interrupt specifies the target virtual bridge identifier, and wherein in response to the second interrupt, the destination compute element allocates the second secondary bus identifier, the second subordinate bus identifier, and the second MMIO bus address range.

17. A computer system comprising:
a processor;
memory communicatively connected to the processor, wherein the memory is encoded with instructions, wherein the instructions when executed on the processor comprise:
receiving a command that requests movement of ownership of a target device from an origin compute element to a destination compute element,
removing, from the origin compute element, a translation of a virtual bridge identifier to a first secondary bus identifier, a first subordinate bus identifier, and a first MMIO bus address range, wherein the target virtual bridge identifier identifies a target virtual bridge to which the target device connects,
adding, to the destination compute element, a translation of the target virtual bridge identifier to a second secondary bus identifier, a second subordinate bus identifier, and a second MMIO bus address range,
removing, from a south chip that comprises the target virtual bridge, a translation of the target virtual bridge identifier to an identifier of the origin compute element, and
adding, to the south chip, a translation of the target virtual bridge identifier to an identifier of the destination compute element.

18. The computer system of claim 17, wherein the instructions further comprise:
in response to the receiving the command, sending a first interrupt to the origin compute element that requests that the origin compute element release the target device.

19. The computer system of claim 18, wherein the instructions further comprise:
if the origin compute element does not release the target device, sending a mechanical release interrupt to the origin compute element at a time when a mechanical release of the target device has not been activated, wherein the mechanical release interrupt indicates that the mechanical release of the target device has been activated.

20. The computer system of claim 19, wherein the instructions further comprise:
if the origin compute element does release the target device, performing the removing from the origin compute element, the adding to the destination compute element, the removing from the south chip, and the adding to the south chip.

21. The computer system of claim 17, wherein the secondary bus identifier identifies a bus that is immediately downstream from the target virtual bridge, wherein the subordinate bus identifier identifies a highest bus identifier of all of buses reachable downstream from the target virtual bridge.

22. The computer system of claim 17, wherein the instructions further comprise:
resetting the target virtual bridge and all components downstream from the target virtual bridge.

23. The computer system of clam 17, wherein the origin compute element is connected to the south chip via a first point-to-point connection, and wherein the destination compute element is connected to the south chip via a second point-to-point connection.

24. The computer system of claim 17, wherein the instructions further comprise:
sending a second interrupt to the destination compute element, wherein the second interrupt specifies the target virtual bridge identifier, and wherein in response to the second interrupt, the destination compute element allocates the second secondary bus identifier, the second subordinate bus identifier, and the second MMIO bus address range.

* * * * *